United States Patent
Beshai

(10) Patent No.: US 7,117,257 B2
(45) Date of Patent: Oct. 3, 2006

(54) MULTI-PHASE ADAPTIVE NETWORK CONFIGURATION

(75) Inventor: Maged E. Beshai, Stittsville (CA)

(73) Assignee: Nortel Networks Ltd, (CA)

( * ) Notice: Subject to any disclaimer, the term of this patent is extended or adjusted under 35 U.S.C. 154(b) by 834 days.

(21) Appl. No.: 10/107,332

(22) Filed: Mar. 28, 2002

(65) Prior Publication Data

US 2003/0185205 A1 Oct. 2, 2003

(51) Int. Cl.
*G06F 15/177* (2006.01)
(52) U.S. Cl. ...................................... 709/221
(58) Field of Classification Search ......... 709/220–223
See application file for complete search history.

(56) References Cited

U.S. PATENT DOCUMENTS

| | | | | |
|---|---|---|---|---|
| 6,570,872 B1* | 5/2003 | Beshai et al. | ............... | 370/369 |
| 6,643,258 B1* | 11/2003 | Ise et al. | ..................... | 370/230 |
| 6,798,742 B1* | 9/2004 | Mawhinney et al. | ........ | 370/230 |
| 6,850,486 B1* | 2/2005 | Saleh et al. | .................. | 370/218 |
| 6,879,783 B1* | 4/2005 | Nakahira | ..................... | 398/51 |
| 6,907,002 B1* | 6/2005 | Beshai et al. | ............... | 370/230 |
| 2002/0078237 A1* | 6/2002 | Leighton et al. | ............ | 709/239 |
| 2002/0080828 A1* | 6/2002 | Ofek et al. | .................. | 370/539 |
| 2002/0080829 A1* | 6/2002 | Ofek et al. | .................. | 370/539 |
| 2003/0135609 A1* | 7/2003 | Carlson et al. | ............ | 709/224 |
| 2003/0147386 A1* | 8/2003 | Zhang et al. | ............... | 370/390 |

* cited by examiner

*Primary Examiner*—David Wiley
*Assistant Examiner*—J. Bret Dennison
(74) *Attorney, Agent, or Firm*—McGuinness & Manaras LLP

(57) ABSTRACT

The present invention enables fast reconfiguration of paths associated with bufferless core nodes in a network where any two edge nodes may interconnect through a core node. In order to enhance network agility and performance, edge nodes associated with a core node are separated into a plurality of groups based on, for example, round-trip delay from the core node. This separates the short-haul paths from the long haul paths, thereby enabling the short-haul paths to be configured more frequently than the long-haul paths. It is preferable that the periods be set such that each additional period is an integer multiple of the previous one. This allows for simultaneous configuration of groups of paths. Although the methods and apparatus of the present invention are most effective for bufferless optical switches, they are still effective for electronic switches which may be bufferless or equipped with input data buffers.

15 Claims, 26 Drawing Sheets

A: 2
B: 3
C: 5
D: 2
E: 4

| 0 | 1 | | | | | | | | | | | | | 14 | 15 |
|---|---|---|---|---|---|---|---|---|---|---|---|---|---|---|---|
| E | B | C | A | C | E | B | C | E | D | A | C | E | C | B | D |

•••• TDM frame 320

↑ time

A: 3
B: 4
C: 4
D: 5
E: 0

| 0 | 1 | | | | | | | | | | | | | 14 | 15 |
|---|---|---|---|---|---|---|---|---|---|---|---|---|---|---|---|
| A | B | C | A | C | D | B | D | B | D | A | C | D | C | B | D |

•••• TDM frame 340

PRIOR ART

*FIG. 3*

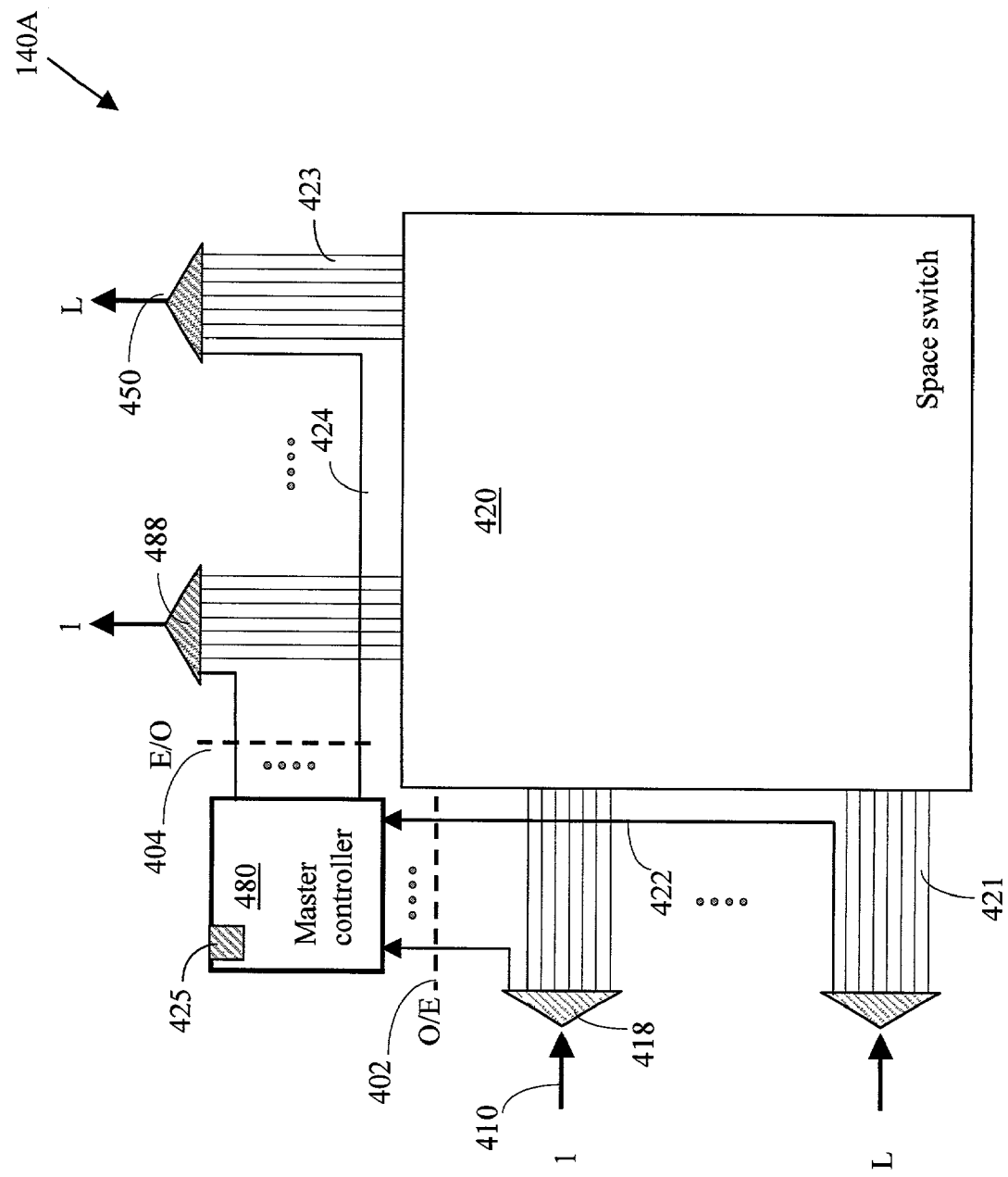
FIG. 4-A

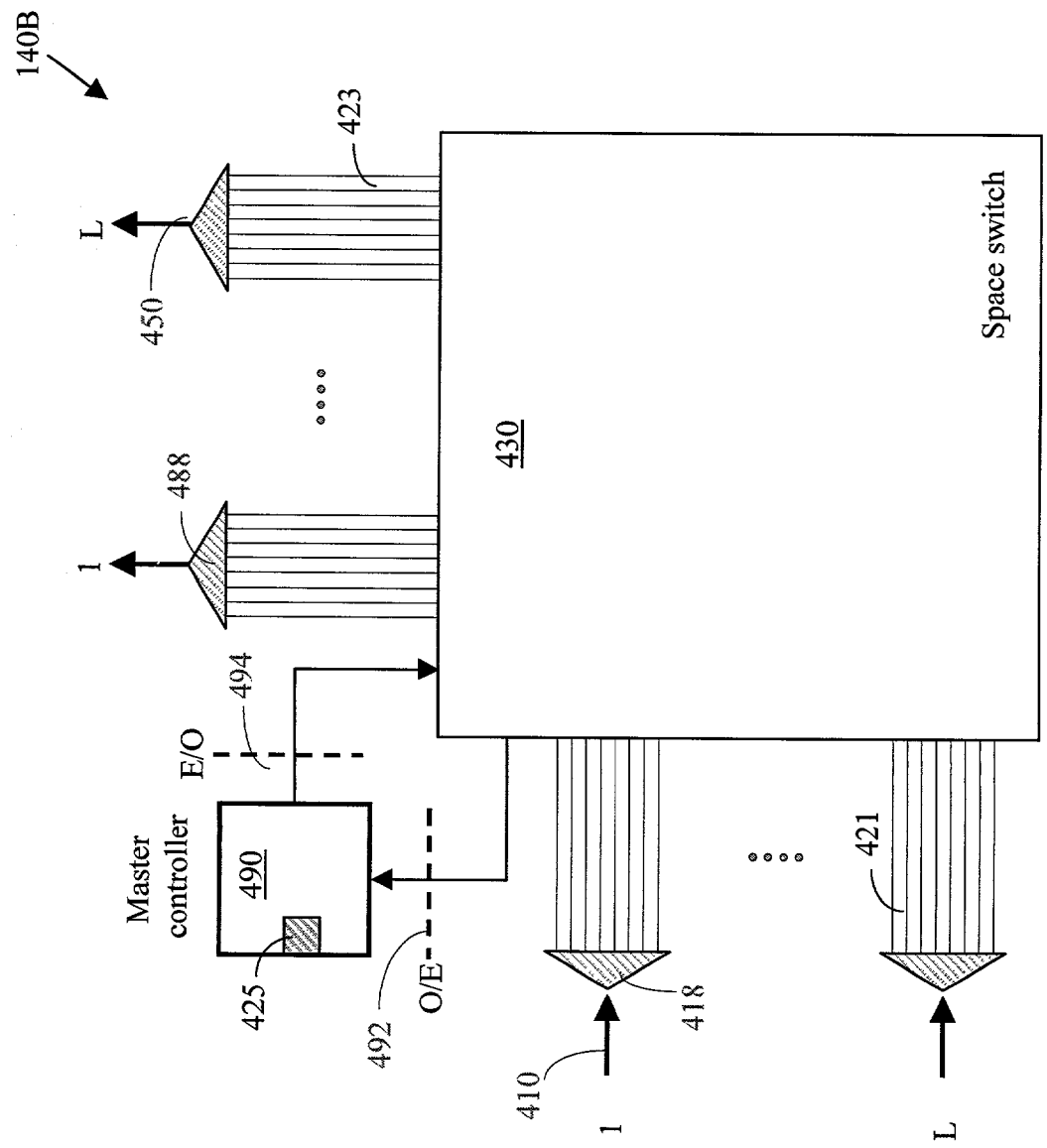
*FIG. 4-B*

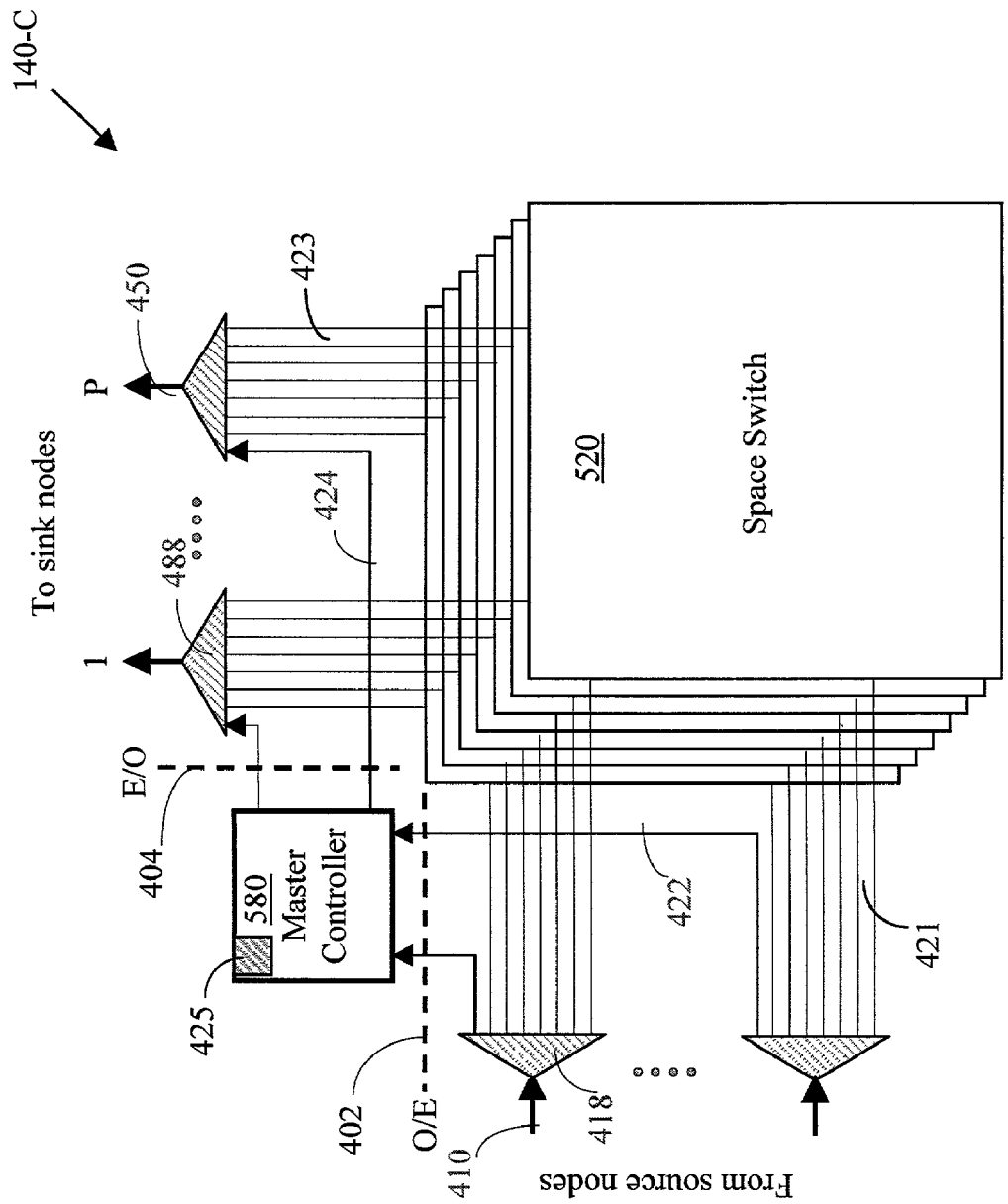
FIG. 5-A

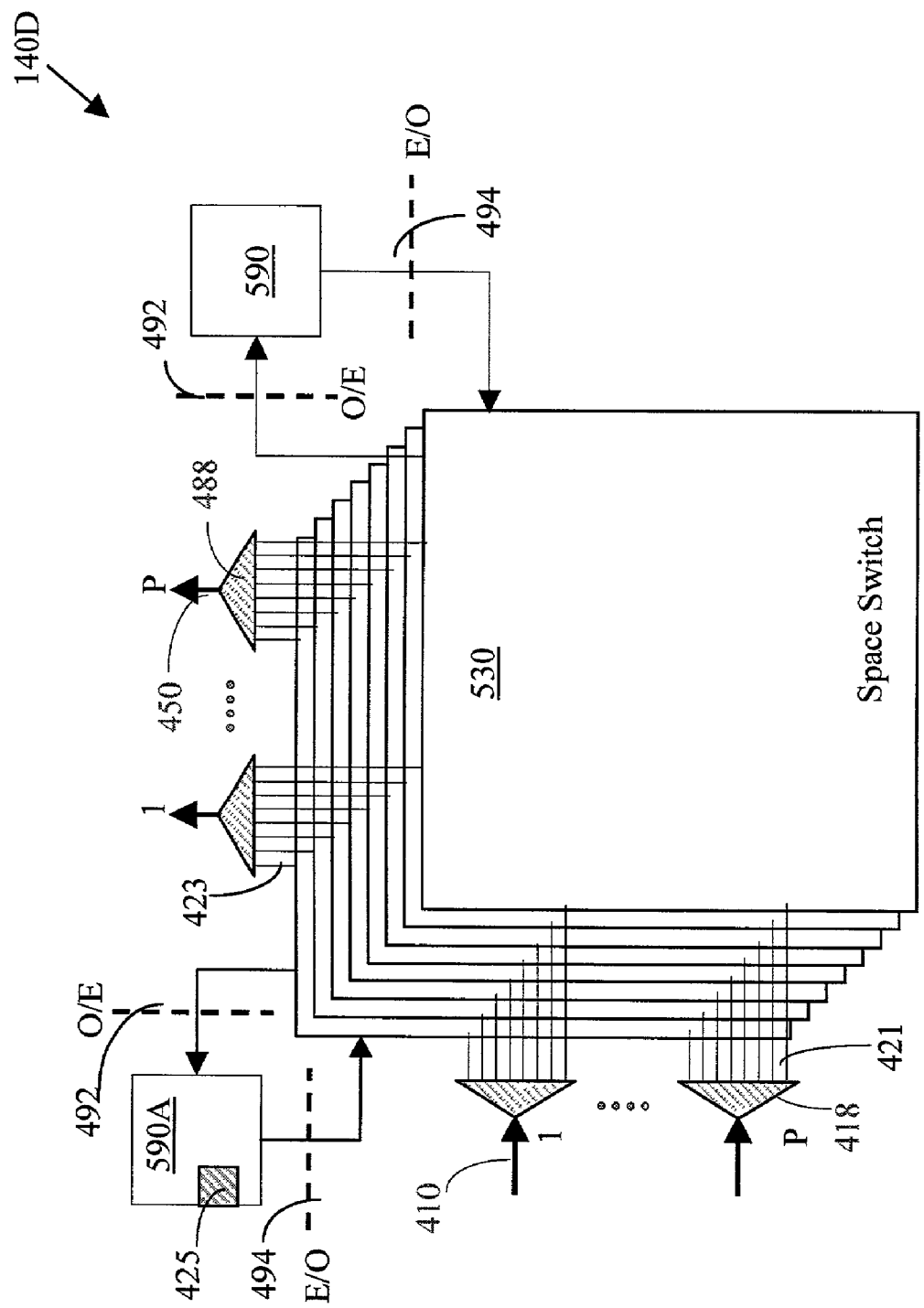
FIG. 5-B

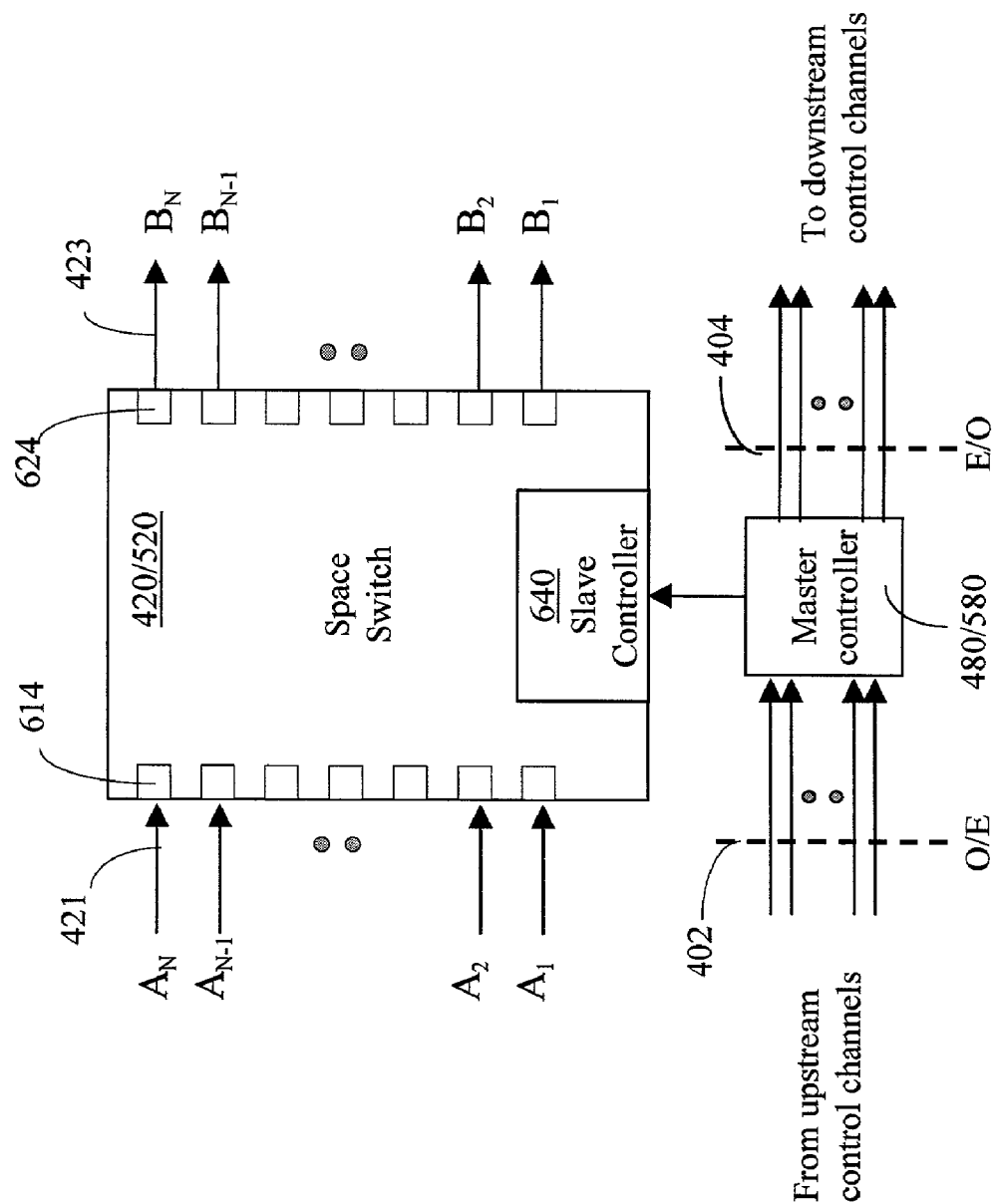
FIG. 6-A

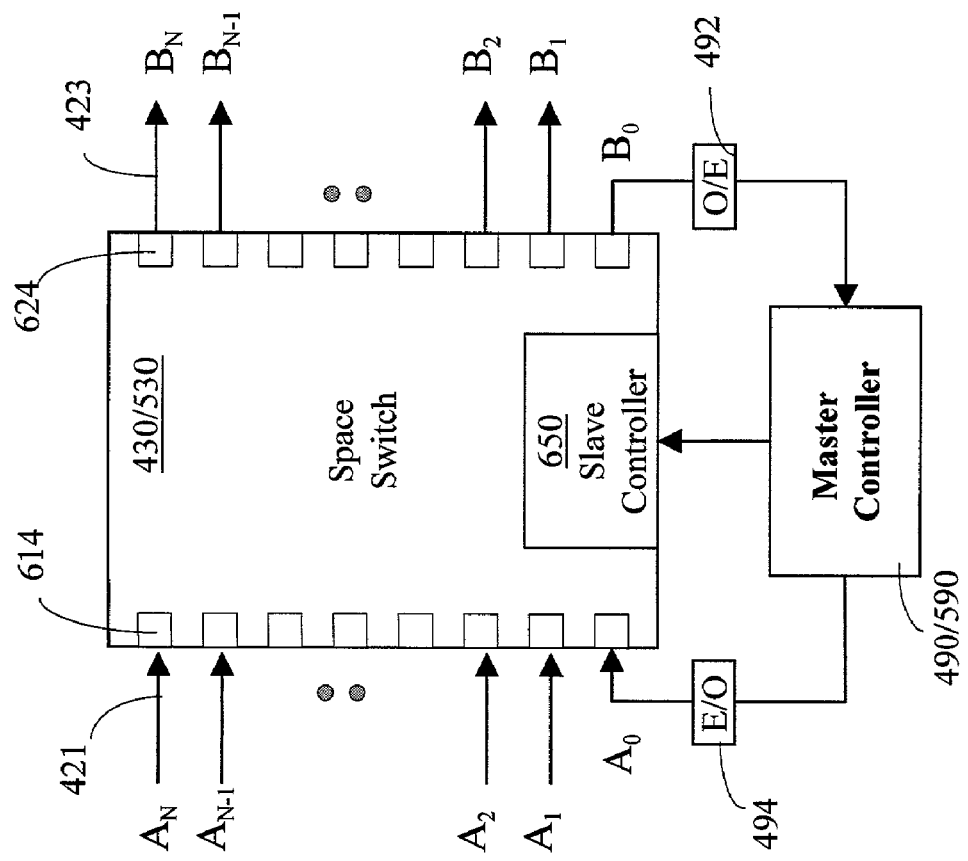
FIG. 6-B

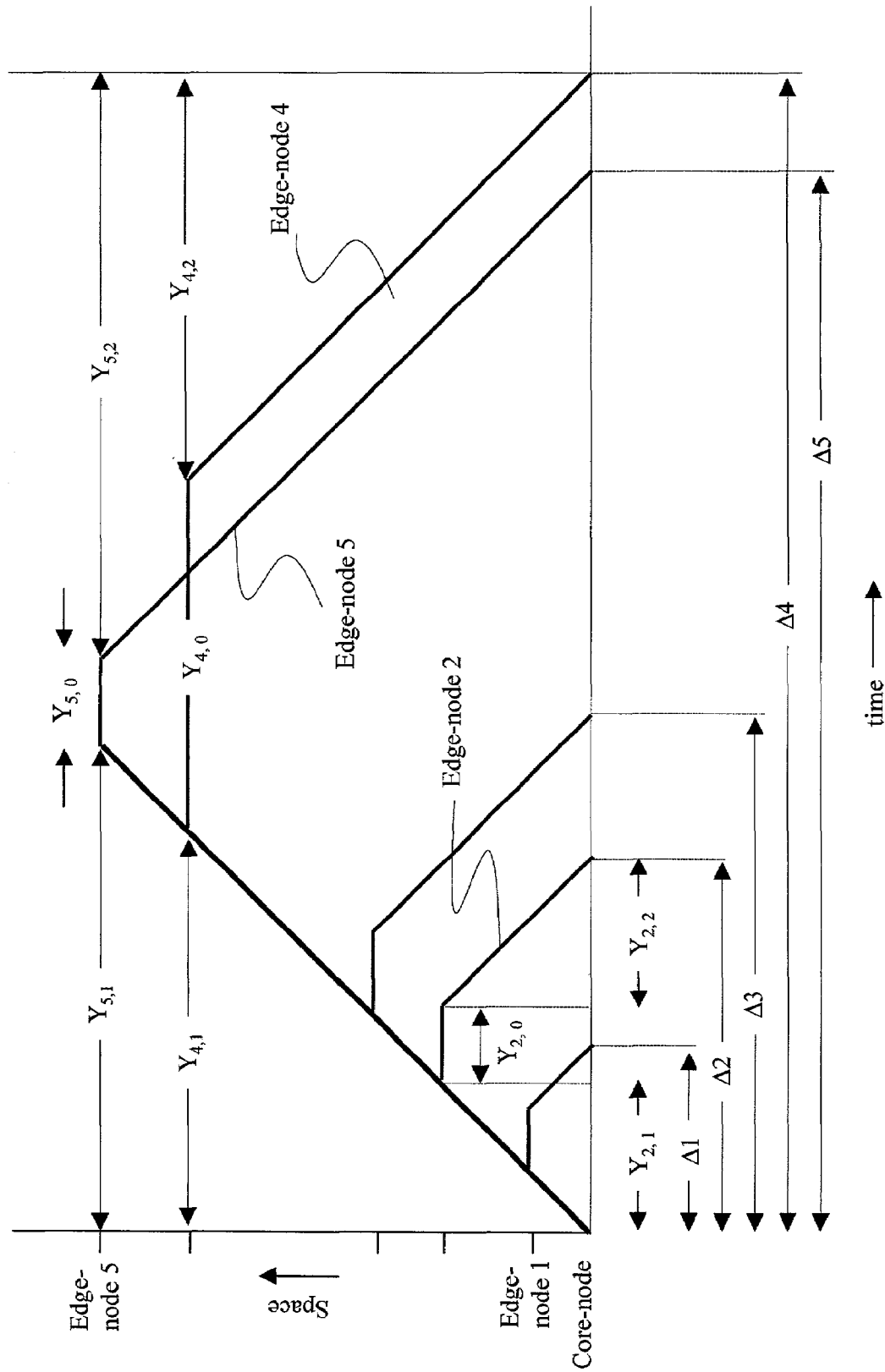
FIG. 11-A

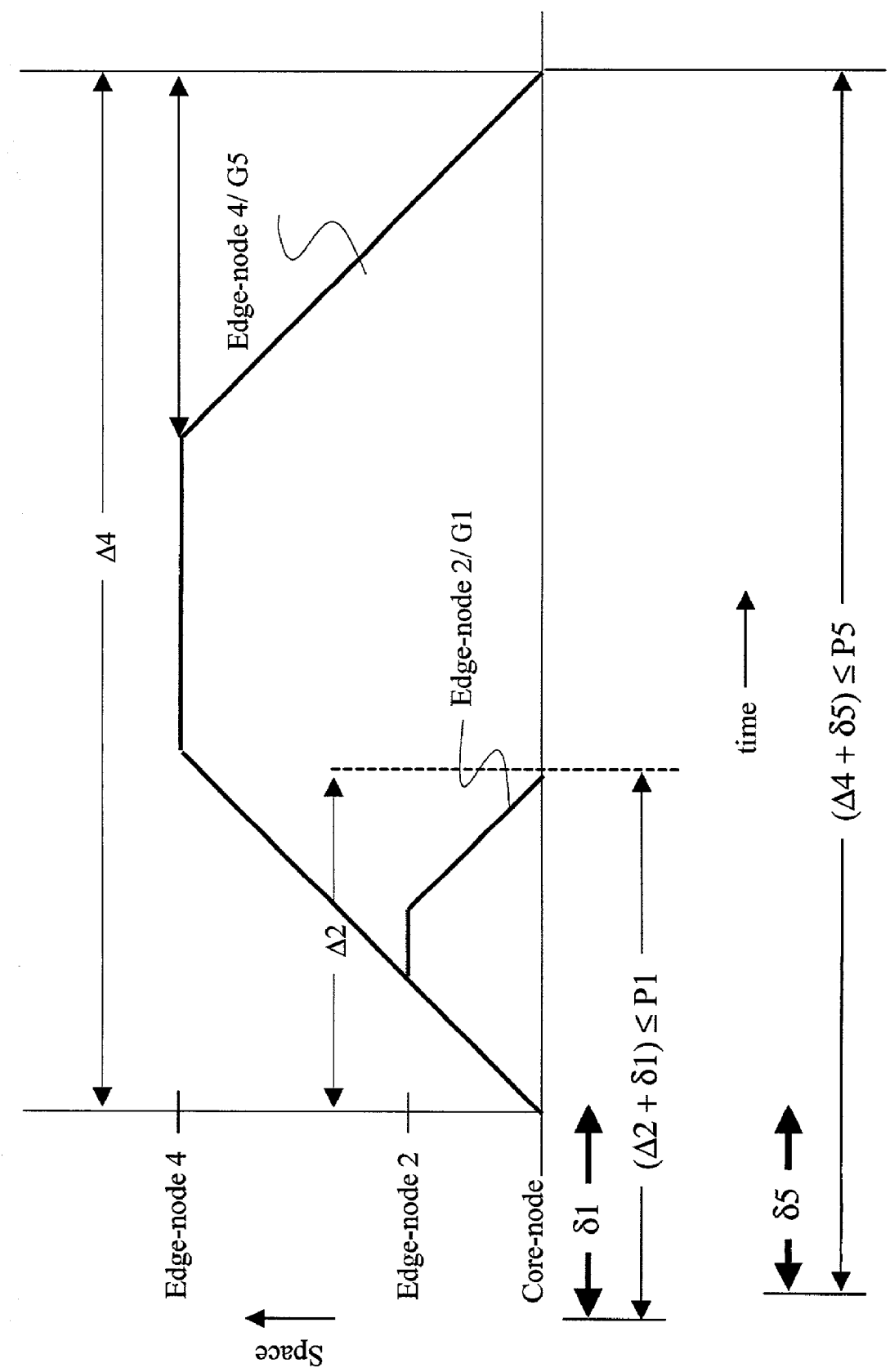
FIG. 11-B

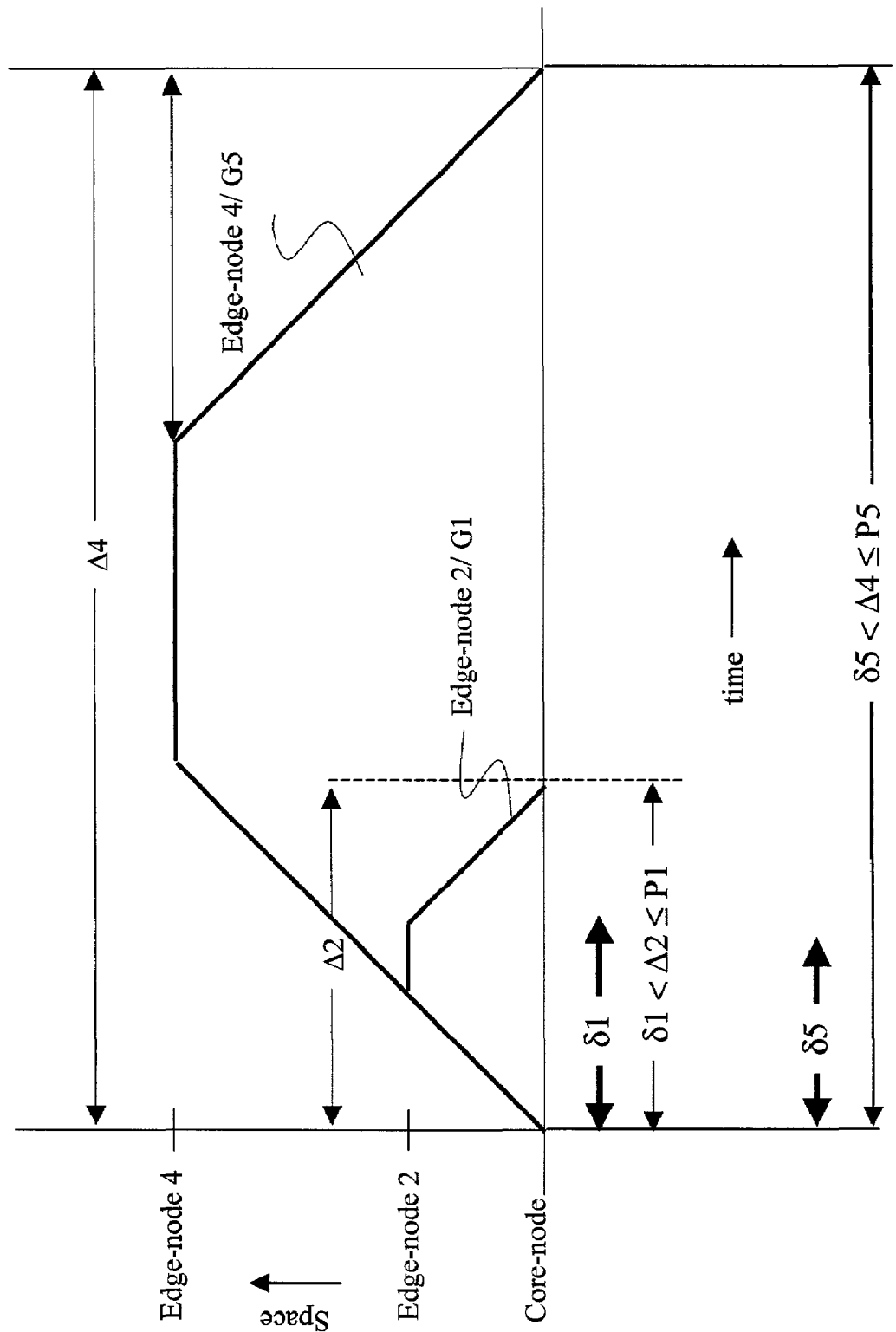
FIG. 11-C

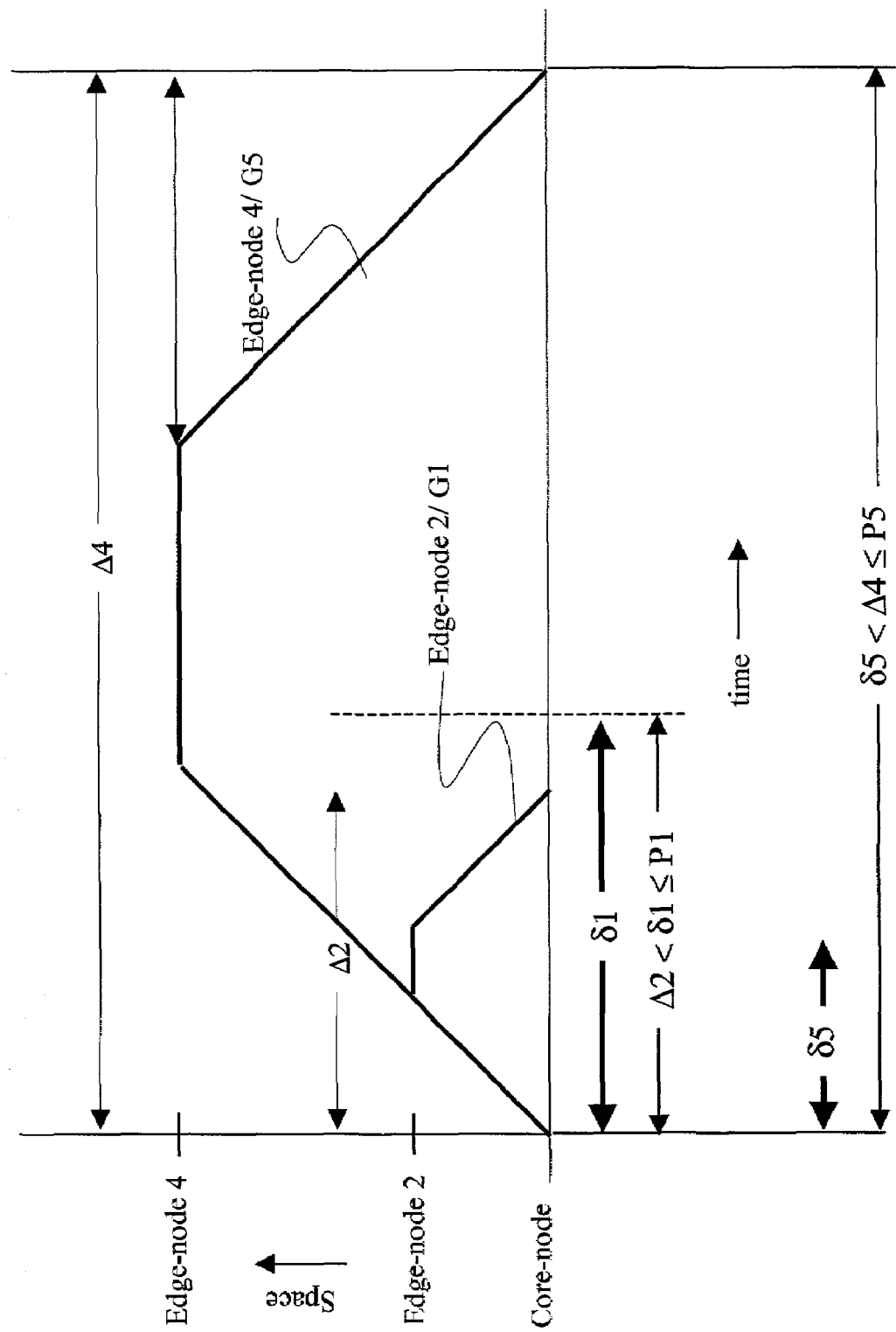
FIG. 11-D

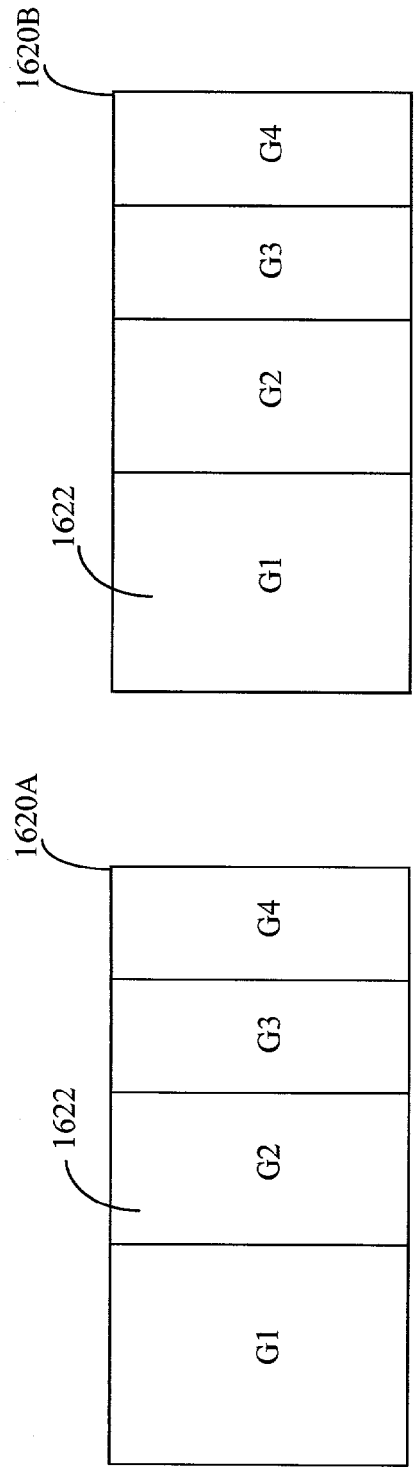
FIG. 16-A
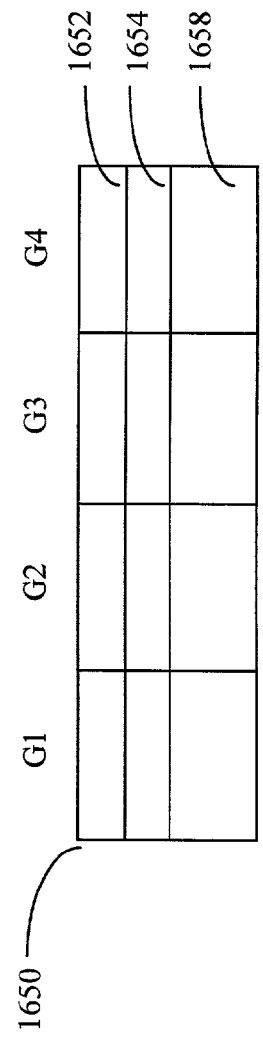
FIG. 16-B

FIG. 17-A

$H = 4$
$m_1 = 1, m_2 = 4, m_3 = 4, m_4 = 2: P_4 = 32 \times P_1$

FIG. 17-B

$m_1 = 1, m_2 = 3, m_3 = 2, m_4 = 4: P_4 = 24 \times P_1$

MULTI-PHASE ADAPTIVE NETWORK CONFIGURATION

FIELD OF INVENTION

The present invention relates to adaptive configuration of a network comprising edge nodes interconnected by core nodes where the capacities of paths connecting edge nodes through the core nodes are continuously adapted to traffic variation. In particular, the present invention is directed to an adaptive network with a selective configuration pace.

BACKGROUND OF THE INVENTION

A topic of widespread interest is the design of a high-capacity wide-coverage controllable and scalable data network. The need for consumption and exchange of information is evidenced by the popularity of the Internet. The demand for information distribution is likely to increase significantly as a result of future network performance improvements. Also, it can be argued that there is a suppressed demand for new services and information transfer at a much higher rate than what today's multi-terabits per second Internet can bear. It is widely accepted that the Next-Generation Internet will be structured using an optical-core interconnecting electronic edge nodes, such as intelligent routers.

A brief description of conventional network architecture and adaptive network reconfiguration is provided below. FIG. 1 illustrates a data network 100 having a large number, possibly several thousands, of edge nodes 120, with each edge node comprising a source node, to be referenced as 120A, and a sink node, to be referenced as 120B. The source node 120A and the sink node 120B of an edge node 120 share memory and control. Where a distinction between the source-node part 120A and the sink-node part 120B of an edge node is not necessary, either may be referenced simply as an edge node 120. The edge nodes 120 may be interconnected through a core stage that comprises at least one core node 140. An edge node that establishes a path through a core node is said to subtend to the core node. An edge node may subtend to some or all of the core nodes 140 of a network 100. When an edge node subtends to two or more core nodes, it selects a core node 140 to establish a path to a given destination edge node according to some merit criterion, such as propagation delay. The edge nodes sending data traffic through a core node are said to be subtending edge nodes of the core node. The edge nodes 120 may, in addition, be interconnected directly by links of static capacity. The capacity of the network is determined by the capacities of the edge nodes 120 and the core nodes 140. The links interconnecting the edge nodes to core nodes or to other edge nodes are preferably wavelength division multiplexed (WDM) links. In the network of FIG. 1, a link from a source node 120A to a core node 140 is hereinafter called an upstream link and a link from a core node to a sink node 120B is called a downstream link. A channel in an upstream link is called an upstream channel and a channel in a downstream link is called a downstream channel.

Reconfiguration of a core node, that receives requests from subtending source nodes to increase path capacities to specified destination sink nodes, generally requires that the core node ensure the availability of sufficient uncommitted capacity to each destination sink node specified in the requests. The admission of a capacity-increase request is determined according to one of two admission policies. According to the first admission policy, the core node ensures the availability of sufficient capacity on the downstream link to a destination sink node but need not consult the sink node. According to the second admission policy, the destination sink node must be consulted. The term 'reconfiguration latency' of an edge node 120 with respect to a given core node 140 is defined herein as the minimum time required to realize a path-capacity-increment request that has been accepted by an admission control process. The reconfiguration latency of an edge node with respect to a core node can be selected as the sum of the interval of time, E1, required by a core-node controller to compute a reconfiguration schedule, and an interval of time, E2, determined as the total of the round-trip propagation delay between the edge node 120 and the core node 140 and the time required by the edge node to modify its internal switching pattern to correspond to a new schedule that the edge node receives from the core node. Alternatively, the reconfiguration latency can be defined as the larger of E2 and E2. The use of the former selection, i.e., the sum of E2 and E2, simplifies time coordination. The term "configuration period" refers to the interval between successive reconfigurations of a core node. The configuration period, with respect to a given core node, must at least equal the largest reconfiguration latency for all edge nodes subtending to the core node.

FIG. 2 illustrates the main components of an edge node 120 of FIG. 1 which participate in the scheduling process in preparation for a reconfiguration. An edge node controller 210 exchanges control signals with a plurality of input-port controllers 220 and a plurality of output-port controllers 230. The edge controller 210 computes a data-transfer schedule and communicates the schedule to the input-port controllers 220 which controls the transfer of data from input ports (not illustrated in FIG. 2) to output ports (not illustrated) through a switching fabric 240 according to the schedule. This enables contention-free transfer of data from the input ports to the output ports of the edge node. The input-port controllers 220 and the output-port controllers 230 may exchange control data directly through an inter-port link 250. Alternatively, the edge controller 210, the input port controllers 220 and the output port controllers 230 may exchange control data over one or more communication buses (not illustrated) provided within the edge node 120.

The switching fabric 240 need not be symmetrical, i.e., the number of input ports need not equal the number of output ports. The inequality can be adapted to traffic distribution, traffic asymmetry, and multi-casting wherein a data stream from a single source is sent to multiple sinks.

To handle traffic of diverse characteristics, several switching modes can coexist in the same network. These switching modes may include link-switching, channel-band switching, single-channel switching, time division multiplexed (TDM) switching, and burst-switching.

The network control is preferably exercised primarily at the edge nodes 120. A simple core structure is essential for realizing a high-capacity high performance network in which the core connectivity can be adapted according to spatial traffic variation, thus yielding an agile network. In an agile network, time locking of edge nodes 120 to core nodes 140 is generally required to enable adaptive reconfiguration. Time locking enables time coordination of the switching functions at the edge nodes 120 and core nodes 140. Without time locking, a large time guard, of the order of several milliseconds, would be needed between successive configuration updates. Even without reconfiguration, time locking is required in the TDM mode to align the time frames at the input ports of each bufferless core node, and in the burst-switching mode to enable efficient burst transfer across the core node. This process of time-coordination is detailed in Applicant's copending U.S. patent application, Ser. No. 10/054,509, filed on Nov. 13, 2001 and titled "Time-Coordination in a Burst-Switching Network".

A parameter of interest in network design is the adjacency of an edge node, which is defined herein as the number of sink nodes that a source node can reach directly or through the network core without switching at an intermediate edge node. In the case where the adjacency is less than the number of sink nodes, the sink nodes that cannot be reached directly from a source node through the core can be reached through tandem switching at intermediate edge nodes. This generally requires that the source node and sink node of each intermediate edge node share the same data memory, which is a common practice in the art.

Switching Mode and Granularity

A network may provide different switching granularities associated with different switching modes including link switching, channel-band switching, single-channel switching, TDM switching, and burst switching.

In the link-switching mode, the entire signal in any of the fiber links from a source node is switched in the core. The core does not inspect the signal carried by any fiber link. It simply directs the link's signal from one fiber link to another. Due to this very coarse granularity, a source node having L upstream fiber links can reach at most L sink nodes.

In the channel-band switching mode, instead of switching the entire signal of a fiber link in unison, the signals in selected channel bands (wavelength bands) can be switched from a source node to a sink node. If the wavelength channels in a link are grouped into B channel bands, then the total number of channel bands from the source node to the core is L×B, which is also the adjacency of the source node.

In the single-channel switching mode, each wavelength channel can be routed independently leading to an adjacency of L×W, where W is the number of wavelength channels carried by a fiber link. This increases the required control effort at the core nodes but reduces the mean number of hops per traffic stream.

In the TDM switching mode, which requires fast-switching core nodes, the data carried on each channel (wavelength) can be organized in a repetitive TDM frame having a predefined number of time slots with a predefined length (bytes) for each time slot. Each time slot has a spatial attribute, typically a data-stream identifier. A data stream is normally defined by its source node, sink node, and a designated network path. A time slot can also be unused, having a null attribute. A TDM frame is used repetitively, but the spatial attributes of some or all of the time slots can change with time. The increased adjacency realized by the use of TDM can eliminate, or significantly reduce, the need for tandem switching through intermediate edge nodes.

FIG. 3 illustrates a reconfiguration process of a TDM core node where, at an input port of a switching fabric of a core node 140, a TDM frame 320 of 16 time slots contains data destined to five output ports labeled A to E with corresponding time-slot allocations per TDM frame of 2, 3, 5, 2, and, 4 respectively. After reconfiguration, the numbers of time-slot allocations to the five output ports, in TDM frame 340, change to 3, 4, 4, 5, and 0, respectively. The time slots allocated for a given output port are preferably evenly spaced in the TDM frame.

In the TDM case, each source node can allocate time slots to any sink node in any of its channels during each TDM frame period. The number of time slots per TDM frame allocated by a source node to any sink node is determined and rounded-up to the nearest integer. The core directs the data in each time slot to an associated destination sink node. Each core node is made aware of the spatial attributes of each time slot in the time-slotted frame in each channel to which it is connected. Suppose a source node has L×W channels connected to the core. If each time frame has S time slots, then the data transferred from a source node to the sink nodes would be segmented in L×W×S time slots for each TDM frame period. These time slots are totally independent, in the sense that each can be routed independently. Thus, the adjacency of a source node can be increased significantly. For example, if L=8, W=40, and S=256, then the data within each of 81920 time slots can be switched independently to different destinations. If the number, N, of edge nodes (sink nodes) is only 2000, for example, then the ratio of the number of time slots to the number of edge nodes is more than 40, and the adjacency of each source node is, therefore, the entire network.

In the burst-switching mode, data bursts of variable sizes are transferred from source to sink. Burst switching is a form of packet switching in which the packet size is sufficiently large to deserve a better treatment than what a packet gets in current IP networks. Burst switching requires fast switching elements in the core. A detailed description of burst switching is given in the aforementioned U.S. patent application, Ser. No. 10/054,509, titled "Time-Coordination in a Burst-Switching Network".

Time coordination is critical in the TDM mode in order to align the time frames at each bufferless core node, and in the burst-switching mode to allow uninterrupted transfer of bursts.

Time coordination, as will be detailed below, is feasible only between a core node and its subtending edge nodes.

Individual Connection Admission Versus Core Reconfiguration

An alternative to individual-connection setup is to setup paths of adaptive capacity for pairs of edge nodes. Establishing paths of adaptive capacity for edge-node pairs offers the advantage of fast connection setup because the admission of a connection is determined only by the respective source node and sink node. With a sink node having a high-capacity data buffer, the connection admission may be determined solely by the source node. To realize simple connection setup without adversely affecting network efficiency, the edge-to-edge paths may adapt their capacities to time-varying traffic levels. The path-capacity unit can be a wavelength channel (typically modulated at 10 Gb/s) in channel switching or a time-slot in a wavelength channel in TDM switching. The latter requires fast-switching core nodes as mentioned earlier.

An agile network is characterized as a network that has paths of adaptive capacities from source nodes to respective sink nodes. The capacity of a path is determined as a number of channels, for channel-switched paths, or a number of time-slots per TDM frame, if channels are time shared and switched in the TDM mode.

Accepting a connection requires examining a route set and selecting a route having a sufficient free capacity. A route set comprises selected candidate routes for an edge-node pair. The capacities of already established paths are adapted to traffic variation. The capacity of a path can be increased by signaling to gain admission from each node along the path. A path-capacity decrement is also signaled so that the nodes along the path can release committed capacity.

In a conventional scheme of establishing new paths, or modifying the capacities of existing paths, requests for capacity modification are processed one at a time. During the connection-setup time, resources are held in an idle state until the respective source node is given permission to start data transmission. The connection-setup period includes round-trip propagation delay and processing delay along intermediate nodes. If the mean holding time of a connection is relatively small, i.e., if connections are created frequently, or their capacity allocations are modified frequently, the idle time of transmission-links can be relatively significant. For example, if connections are created or modified every one second, a setup period of 100 milliseconds, for example, results in a relative capacity loss of 0.1. In addition, in an admission system based on individual connection setup, a significant mean vacancy of transmission links is required to reduce connection-request blocking.

In another scheme, requests for establishing new paths or capacity modification of existing paths are processed periodically where a core node can be reconfigured at designated instants, and each respective edge node is reconfigured at an instant that is determined to suit the core-configuration time. The minimum interval between successive reconfigurations is dictated primarily by the round-trip delay between a core node and the edge nodes. In a network of wide coverage, the round-trip delay between a core node and its adjacent edge nodes can vary significantly, for example between a fraction of a millisecond and a hundred milliseconds. Scheduling the reconfiguration of a core node to suit the highest round-trip delay can result in reduced network agility.

Therefore, there is a need for a method of path-capacity adaptation that takes into account the disparity in propagation delays between the edge nodes and the core nodes. In particular, a method is needed whereby the pace of reconfiguration of a core node is adapted so that a core node reconfigures more frequently to satisfy requests from close edge nodes without disturbing paths from distant edge nodes.

SUMMARY OF THE INVENTION

The present invention enables reconfiguration of paths associated with core nodes. Edge nodes associated with a core node may be separated into a plurality of groups based on reconfiguration latency with respect to a core node through which connections are made. The reconfiguration latency is determined by propagation delay, processing time at edge nodes, and processing time at a core-node controller. The reconfiguration latency is likely to be dominated by the propagation delay and this separates the short-haul paths from the long haul paths, thereby enabling the short-haul paths to be configured more frequently than the long-haul paths. Nodes may alternatively be separated into a plurality of groups according to any other criteria including, for example, a distinction based on node-class.

In an adaptive network according to an embodiment of the present invention comprising edge nodes interconnected by a plurality of core nodes, each edge node preferably time locks to one or more of said core nodes. In such an embodiment, each edge node sends its time-varying capacity requirements to respective core-node controllers. Each core node initiates a multi-phase reconfiguration process based on both the capacity requirements and its proximity to the edge nodes. Only edge nodes that request capacity-allocation changes need participate in a reconfiguration exercise. In a first phase of a two-phase process, for example, only edge nodes within a reconfiguration-latency threshold of one millisecond with respect to a core node would be instructed by the core node to reconfigure, at an instant of time specified by the core node. In the second phase, all edge nodes requesting capacity-allocation changes are likewise instructed to reconfigure at an instant of time calculated by a respective core node. When the round-trip propagation delay between a core node and its subtending edge nodes has a high variance, it may be necessary that adaptive reconfiguration be implemented in more than two phases.

According to an aspect of the present invention, there is provided a method of adaptively configuring a network, said network having at least one core node and a plurality of edge nodes, the method comprising the steps of: configuring paths associated with a reference core node and a first set of edge nodes within a first configuration period, said first set of edge nodes each having a reconfiguration latency with respect to said reference core node less than said first configuration period; and configuring paths associated with said reference core node and a second set of edge nodes within a second configuration period, said second configuration period being larger than said first configuration period, and said second set of edge nodes each having a reconfiguration latency with respect to said reference core node less than said second configuration period. It is understood that the method is applicable to any number of configuration periods.

According to a preferred embodiment of the present invention, the following steps are performed before the step of configuring a core node and a first set of edge nodes: establishing a first group of edge nodes, said first group comprising all edge nodes having a reconfiguration latency less than a first configuration period with respect to said core node; establishing a second group of edge nodes, said second group comprising all edge nodes having a reconfiguration latency less than a second configuration period with respect to said core node but greater than said first configuration period; and wherein said first set of edge nodes comprises all edge nodes in the first group requiring configuration within said first configuration period, and wherein said second set of edge nodes comprises all edge nodes in both the first group and the second group requiring configuration within said second configuration period.

According to another aspect of the present invention, there is provided an apparatus for adaptively configuring a network, said network having at least one core node and a plurality of edge nodes, said apparatus comprising: means for configuring paths associated with a core node and a first set of edge nodes within a first configuration period, said first set of edge nodes each having a reconfiguration latency with respect to said core node less than a first configuration period; and means for configuring paths associated with said core node and a second set of edge nodes within a second configuration period, said second configuration period being larger than said first configuration period, and said second set of edge nodes each having a reconfiguration latency with respect to said core node less than said second configuration period.

According to a preferred embodiment, an apparatus according to the present invention further comprises: means for creating a first group of edge nodes, said first group comprising all edge nodes having a reconfiguration latency less than a first configuration period with respect to a core node; and means for creating a second group of edge nodes, said second group comprising all edge nodes having a reconfiguration latency less than a second configuration period with respect to said core node but greater than said first configuration period; wherein said first set of edge nodes comprises all edge nodes in the first group requiring configuration within said first configuration period, and wherein said second set of edge nodes comprises all edge nodes in both the first group and the second group requiring configuration within said second configuration period.

According to yet another aspect of the present invention, there is provided a core node controller for a core node having input ports and output ports, said controller comprising: means for receiving connectivity requirements from at least two of said edge nodes within a configuration period; means for computing schedules for establishing paths between said input ports and said output ports; means for communicating with a plurality of edge node controllers at a plurality of edge nodes; means for classifying said plurality of edge nodes into a plurality of groups based on a reconfiguration latency of each edge node with respect to said core node; means for scheduling reconfiguration of at least some of said paths based on at least some of said connectivity requirements; means for distributing a connectivity schedule to a set of said edge nodes, said set comprising edge nodes from at least one of said groups; and means for reconfiguring at least some of said paths according to at least some of said connectivity requirements.

According to a preferred embodiment of this aspect of the present invention, the means for classifying said plurality of edge nodes into a plurality of groups of edge nodes with respect to a core node comprises: means for creating a first group of edge nodes, said first group comprising all edge nodes having a reconfiguration latency with respect to said core node less than a first configuration period; and means for creating a second group of edge nodes, said second group comprising all edge nodes having a reconfiguration latency less than a second configuration period with respect to said core node but greater than said first configuration period.

According to a further aspect of the present invention, there is provided an edge node controller for an edge node including: means for estimating a current bit rate requirement for data directed to any other edge node; means for selecting a core node through which data may be sent; means for signaling said requirement to a core node controller of said core node; means for receiving a reply from said core node controller, said reply including reconfiguration scheduling information; and means for time locking said edge node to said core node for participating in a scheduled reconfiguration.

According to a still further aspect of the present invention, there is provided a computer program product having a medium with a computer program embodied thereon, the computer program comprising: computer program code for computing connectivity of paths between input ports and output ports of a core node in a network; computer program code for communicating with a plurality of edge node controllers at a plurality of edge nodes in said network; computer program code for classifying said plurality of edge nodes into a plurality of groups based on a reconfiguration latency of each edge node with respect to said core node; computer program code for receiving connectivity requirements from at least some of said edge nodes within a configuration period; computer program code for scheduling reconfiguration of at least some of said paths based on at least some of said connectivity requirements; computer program code for distributing a connectivity schedule to a set of said edge nodes, said set comprising nodes from at least one of said groups; and computer program code for reconfiguring at least some of said paths according to at least some of said connectivity requirements.

According to a preferred embodiment of the computer program product, the computer program further comprises: computer program code for creating a first group of edge nodes, said first group comprising all edge nodes having a reconfiguration latency less than a first configuration period with respect to said core node; and computer program code for creating a second group of edge nodes, said second group comprising all edge nodes having a reconfiguration latency less than a second configuration period with respect to said core node but greater than said first configuration period.

According to still another aspect of the present invention, there is provided an apparatus for controlling the reconfiguration of edge nodes with respect to a reference core node that interconnects said edge nodes in a network, wherein said edge nodes are divided into a plurality of edge-node groups, and each of said edge-node groups can modify its connectivity to other edge nodes through the reference core node, the apparatus comprising: a configuration-control memory holding a configuration-control matrix, two complementary connectivity memories each holding connectivity data, a connectivity-tracking memory indexing the connectivity memory holding current data for each edge-node group, and a processing circuit connected to said configuration-control memory, said complementary connectivity memories, and said connectivity-tracking memory, for facilitating communication therebetween, the apparatus operable to compute a connectivity schedule for each edge-node group with corresponding connectivity changes in said reference core node, implement connectivity changes in said reference core node; and distribute edge-node-specific connectivity changes to respective edge nodes.

For both the methods and apparatus according to embodiments of the present invention, it is preferable that the configuration periods be set such that the second configuration period is an integer multiple of the first configuration period. This concept would extend to any subsequent third, fourth, etc. configuration periods, where each additional configuration period is an integer multiple of the preceding configuration period.

Although the methods and apparatus of the present invention are most effective for bufferless optical switches, they are equally effective for electronic bufferless switches. The methods are naturally applicable to electronic core switches that are provided with input-buffering capability, where time locking within a tolerance time-window would be permitted.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will be further described with reference to the accompanying drawings in which:

FIG. 3 illustrates a conventional reconfiguration of a TDM frame;

FIG. 4-A illustrates a core node having a single-plane space switch, operated as a wavelength-channel switch, and a master controller, the core node switching entire wavelength channels and the master controller connecting to dedicated control channels, each control channel corresponding to a wavelength channel in a WDM fiber link;

FIG. 4-B illustrates a core node having a single-plane space switch, operated as a TDM switch, and a master controller receiving and transmitting in-band control signals;

FIG. 5-A illustrates a core node comprising parallel space switches and a master controller, the core node switching entire wavelength channels and the master controller connecting to dedicated control channels, each control channel corresponding to a wavelength channel in a WDM fiber link;

FIG. 5-B illustrates a core node comprising parallel space switches having a plurality of master controllers, each space switch operated as a TDM switch, and the master controllers receiving and transmitting in-band control signals;

FIG. 6-A illustrates a space switch used in a core node of FIG. 4-A or FIG. 5-A;

FIG. 6-B illustrates a low-latency space switch used in a core node of FIG. 4-B or FIG. 5-B;

FIG. 11-A illustrates the components of a round-trip delay in a network;

FIG. 11-B illustrates the components of reconfiguration latency according to a first definition;

FIGS. 11-C and 11-D illustrate the components of reconfiguration latency according to a second definition;

FIG. 16-A illustrates two complementary connectivity memories holding current and succeeding connectivity sub-matrices, in accordance with an embodiment of the present invention.

FIG. 16-B illustrates a connectivity-tracking matrix for identifying the content of the two complementary memories of FIG. 16-A, in accordance with an embodiment of the present invention.

FIG. 17-A illustrates an example of a configuration-control matrix with respect to a core node, in accordance with an embodiment of the present invention.

FIG. 17-B illustrates another example of a configuration-control matrix with respect to a core node.

DETAILED DESCRIPTION OF THE INVENTION

Figure 1:
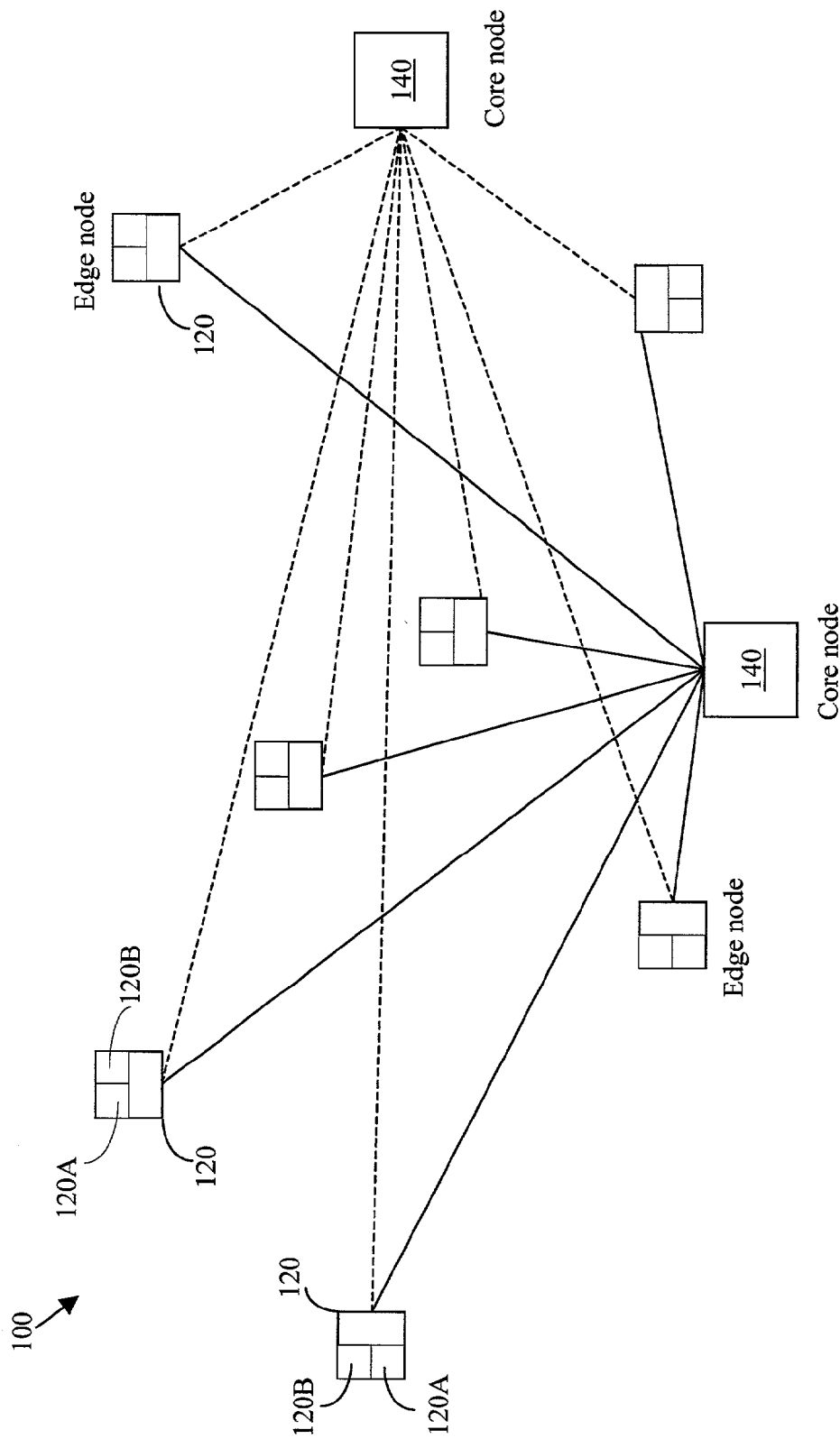
FIG. 1 illustrates a data network having a plurality of edge nodes and core nodes.

Before describing embodiments of the present invention, a description of the nodes constituting the adaptive network is provided, followed by a discussion of the concept of time locking, because this concept is important to the understanding of the present invention. This concept is described in a co-pending and commonly assigned U.S. patent application, Ser. No. 10/054,509, titled "Time-coordination in a burst-switching network" of Beshai et al, filed in the United States Patent Office on Nov. 13, 2001.

In a network 100, path reconfiguration requires that at least one core node 140 changes connectivity and subtending edge nodes 120 redirect their traffic to newly formed paths. The edge nodes considered in this disclosure are electronic based and each can have a capacity that can scale to several terabits per second (Tb/s). The core nodes preferably comprise optical space switches, although high-capacity electronic space switches can provide a powerful stopgap until optical switches are well developed. In a core node 140, an input port supports an upstream channel and an output port supports a downstream channel. In a WDM link, a channel is typically associated with a single wavelength. A typical channel capacity is 10 Gb/s. A space switch in a core node 140, optical or electronic, has an upper bound, P, of the number of dual ports (a dual port comprises an input port and an output port) that can be provided. Data is transferred from an edge node 120 to a core node 140 in multi-channel links, typically WDM fiber links. At the core node 140, a WDM link is demultiplexed into individual channels (wavelengths) or channel bands (wavelength bands), which are switched as separate entities, then multiplexed onto several WDM links for transport to the sink nodes. For the purpose of switching and routing, a channel band, however defined, is treated as a single channel and, therefore, reference to channel bands is not necessary.

Connectivity Schedule

A connectivity schedule is computed by a controller of a core node and distributed to subtending edge nodes. The connectivity schedule indicates the timing of connectivity changes at each source node to correspond to connectivity change in the core node, taking into account the differing propagation delays between the subtending edge nodes and the core node.

A time-locking process, to be detailed below, unifies the time at a core node and its subtending edge nodes (source nodes). This significantly simplifies the time-coordination process. In a channel-switching core node, the connectivity schedule distributed by a core node indicates, for each subtending source node, a sink node to which the source node will connect at an instant of time indicated in the connectivity schedule. In a TDM-switching core node, the connectivity schedule distributed by the core node indicates, for each subtending source node, a sink node to which the source node will connect during each time slot in a TDM frame.

Core-Node Configuration

Four configurations of a core node 140, hereinafter referenced as 140A, 140B, 140C, and 140D, are described below.

In a core node 140A, depicted in FIG. 4-A, each upstream WDM fiber link 410 has W>1 wavelength channels of which one channel 422, hereinafter called an upstream control channel, is directed away from the space switch 420 towards a master controller 480 and the remaining (W−1) channels are upstream payload channels 421 that connect to the switching fabric of space switch 420. Channel 422 is a dedicated control channel. Each downstream WDM link 450 also has W wavelength channels of which one channel 424, hereinafter called a downstream control channel, receives control data from master controller 480. The remaining (W−1) channels 423 are downstream payload channels that carry payload signals destined to a sink node 120B. A channel 421 in an upstream link 410 can connect to any channel 423 in a downstream link 450. In the case of WDM fiber links, wavelength conversion would be required, either at input or at output of the space switch 420, to enable unrestricted channel switching within the same space switch.

If low switching-latency can be realized in the switching fabric, a time-sharing scheme, such as TDM can be used, and control signals sent by subtending edge nodes 120 can be carried 'in-band', occupying pre-assigned time slots in a TDM frame.

In a core node 140B, depicted in FIG. 4-B, a space switch 430 has a switching latency that is significantly smaller than the duration of a time slot in a TDM frame. As depicted in FIG. 4-B, a master controller 490 is connected to only one dual port (i.e., one input port and one output port) of the space switch 430. The W channels of each upstream link or downstream link are connected to W ports of a space switch 430.

In a core node 140C, depicted in FIG. 5-A, parallel space switches 520 are used. As in the core-node configuration 140A (FIG. 4-A), each upstream link 410 having W>1 wavelength channels directs a channel 422 (an upstream control channel) to a master controller 580, and each of the remaining (W−1) channels 421 connects to one of the parallel space switches 520.

In a core node 140D, depicted in FIG. 5-B, the switching fabric allows low-latency switching. Therefore, in-band control, where control data is carried during at least one time slot in a TDM frame, can be applied. The W channels of each upstream link 410 can connect to W different space switches as depicted in FIG. 5-B, which illustrates a core node 140D having W>1 parallel space switches 530, each of which having a low switching latency to permit TDM switching. A master controller 590 in each space switch 530 can receive control signals in-band during designated time slots. The master controllers 590 are electronic devices and are mutually interconnected by an internal bus (not illustrated).

In a core node 140C or 140D, each having parallel space switches, an input port in a space switch 520 or 530 can only communicate with output ports of the same space switch 520 or 530. Each source node, therefore, selects at least one of the parallel space switches to transfer data to a given sink node.

Bit-Rate-Allocation

Each of master controllers 480, 490, and 580 includes a bit-rate-allocation module 425. However, only a designated one of the master controllers 590 (referenced as 590A) of a core-node 140D need be provided with a bit-rate-allocation module 425. The bit-rate-allocation module 425 of any core node 140 controls the admission of new connection requests for the core node. The reconfiguration of any core node 140, i.e., the modification of the connectivity pattern of any core node 140, is based on bit-rate allocations permitted by the a respective bit-rate-allocation module 425. In a core node 140D, where connectivity scheduling can be substantially more computationally intensive in comparison with core nodes 140A, 140B, and 140C, it is preferable that the computation of a TDM connectivity schedule for each of the space switches 530 of the core node 140D be performed by an associated master controller 590. However, as described above, the bit-rate-allocation process, which applies to the entire core node 140D, is by necessity performed by a single bit-rate-allocation module 425 associated with only one of the master controllers 590.

The bit-rate-allocation module 425 in a given core node 140 collects all the bitrate-allocation requests from all source nodes 120A subtending to the core node and produces an L×L bitrate allocation matrix, L being the number of upstream links 410 or downstream links 450 in the core node. The bit-rate-allocation matrix contains all the bitrate requirements from source nodes 120A to sink nodes 120B through the given core node 140. Each row in the matrix corresponds to a source node, each column corresponds to a sink node, and the sum of any column in the matrix must not exceed the capacity of the paths from the core node to the corresponding sink node. Satisfying this condition may result in adjusting or rejecting some of the bitrate allocation requests. The selection of entries to be adjusted or rejected is a matter of network-management policy.

In a core node 140C or 140D, having parallel space switches 520 or 530, the bit-rate-allocations are divided among the parallel switches 520 or 530. The bit-rate-allocation module 425 performs the function of admission control by ensuring that the total bitrate allocation for each output port in each of the space switches 520 or 530 does not exceed the capacity of the output port or the capacity of the downstream channel 423 emanating from the output port.

Network Coverage

In a core node 140A (FIG. 4-A), the maximum number, L, of links per space switch is $L=\lfloor P/(W-1) \rfloor$, and in a core node 140B (FIG. 4-B), the maximum number of links per space switch 430 is $L=\lfloor (P-1)/W \rfloor$, where $\lfloor r \rfloor$ denotes the integer part of a real number r, P being the maximum number of input ports or output ports of the space switch 420 or 430 and W is the number of wavelength channels per fiber link. In a core node 140C (FIG. 5-A) or a core node 140D (FIG. 5-B), P links (L=P) can be supported. The number of parallel space switches is (W−1) in a core node 140C and W in a core node 140D. With P=1000, and W=40, a core node 140A or 140B supports 25 dual links (a dual link refers to an upstream link 410 and a downstream link 450), while a core nodes 140C supports 1000 dual links and a core node 140D supports 999 dual links. The structure of FIG. 5-A or FIG. 5-B has the advantage of increased capacity, in comparison with the structures of FIGS. 4-A and 4-B.

Several core nodes 140 (140A, 140B, 140C, or 140D) can be connected in a mesh structure to support a larger number of multi-channel links. In a mesh structure using core nodes supporting L links of W channels each, the L links can be divided into J links, $1 \leq J < L$, to be connected to edge nodes, and (L−J) inner links to be connected to other space switches configured similarly, leading to a network of J×(L−J+1) upstream (and down stream) links. Typically, (L−J)>J, to realize an internal expansion which reduces, or eliminates, connection-request blocking. In the example above for core nodes 140A or 140B, with L=25 and J=10, (L−J)=15 and the number of upstream links is 160. With 40 channels of 10 Gb/s capacity each, a link capacity is 400 Gb/s, and the total network-access capacity is 64 Terabits per second. With the above parameters and the core nodes of FIGS. 5-A and 5-B, L=1000 and the realizable network capacity is of the order of tens of Petabits per second. The purpose of using core nodes having parallel space switches, as illustrated in FIGS. 5-A and 5-B, is to eliminate the need for a mesh structure where the core nodes are interconnected. In a simple star-like structure, where the core nodes are operated independently and are not interconnected, and with the parameters above, a network-access capacity, per core node, of the order of 400 Terabits per second can be realized while significantly simplifying the routing function and other network controls.

Configuration Control of a Bufferless Core Node

A master controller 480, 490, 580, or the assembly of master controllers 590 determines a respective core-node connectivity on the basis of configuration requests received from the edge nodes 120 and processed by a bit-rate-allocation module 425.

Each source node 120A has at least one time counter associated with each core node to which source node 120A subtends. A source node 120A may have one time counter associated with each wavelength channel in an upstream WDM link 410 leading to a single core node 140.

Each of the master controllers 480, 490, 580, or 590 has a time counter called a 'master time counter'. All time counters of subtending edge nodes 120 of a core node 140 have the same period of a respective master time counter of the core node 140. Both the master controllers and slave controllers are preferably hardware operated to realize high-speed control.

In a core node 140C/140D having several optical switches 520/530, as illustrated in FIGS. 5-A and 5-B, preferably each optical switch should have its own slave controller 640/650. Also, as will be described later with reference to time-locking requirements, a source node 120A may be time-locked separately to each of the plurality of optical switches 520/530, because of the different propagation delays experienced by channels of different wavelengths in an upstream WDM link connecting a source node 120A to a core node 140.

Space Switch

FIG. 6-A illustrates a space switch 420 or 520 having N>1 input ports 614 and N output ports 624. A space switch 420 or 520 switches entire wavelength channels from the input ports 614 to the output ports 624. Each input port 614 has a receiver operable to receive an optical signal from an optical channel and each output port 624 has a transmitter that is operable to transmit an optical signal through an optical channel. The N input ports 614 can simultaneously receive N optical signals and the N output ports 624 can simultaneously transmit N optical signals.

A space switch 420 or 520 has a slave controller 640 that effects input-output connectivity. A core node 140A has a master controller 480 and a core node 140C, comprising a plurality of channel space switches 520, has a master controller 580.

Slave controller 640 implements input-output connectivity for a channel-switching core node 140A or 140C based on a connectivity array it receives from a respective master controller 480 or 580. The master controller 580 receives control messages from upstream links 410 through control channels 422 and an O/E (optical-to-electrical) interface 402. The master controller 580 sends control messages through an E/O (electrical-to-optical) interface 404 and a downstream control channel 424.

FIG. 6-B illustrates a space switch 430 or 530 having (N+1) input ports and (N+1) output ports of which N input ports 614, labeled $A_1$ to $A_N$, carry payload signals originating at subtending edge nodes and N output ports 624, $B_1$ to $B_N$, carry payload signals destined to subtending edge nodes. One input port, labeled $A_0$, is an input control port and one output port, labeled $B_0$, is an output control port. The control ports connect to a master controller 490 or 590 through a space switch 430 or 530, respectively. The space switch 430 or 530 switch time slots of a TDM frame. A master controller 490 or 590 determines the connectivity matrix of input ports 614 to output ports 624 and communicates the connectivity matrix to a respective slave controller 650. The master controller 490/590 sends control messages to any of output ports $B_1$ to $B_N$ through an E/O (electrical-to-optical) interface 494, control input port $A_0$ and the optical switch 430/530. The master controller 490/590 receives control messages from input ports $A_1$ to $A_N$ through the optical switch 430/530, control output port $B_0$ and an O/E (optical-to-electrical) interface 492.

In-Band Control

In a fast-switching core node, data units are received from upstream links 410, each data unit being destined to a specified output port $B_x$, $1 \leq x \leq N$. Some data units, hereinafter called control packets, are destined to the master controller 490/590. The control packets carried by the N upstream channels 421 connecting to a space switch 430/530 are staggered so that the master controller 490/590 receives, through control output port $B_0$, the content of each control packet one at a time. The control packets are preferably of equal size.

Slave controller 650 implements input-output connectivity for each time slot in a TDM frame based on a connectivity matrix it receives from a respective master controller 490 or 590. The connectivity patterns may differ significantly between time slots. This will be further described below with reference to FIG. 14.

Control of the input/output connectivity of a space switch 430 or 530 in a core node 140B or 140D is performed by the slave controller 650 which receives connectivity instructions from a master controller associated with the space switch. The input ports 614 receive signals carrying TDM data from source nodes 120A through incoming WDM links 410, which are demultiplexed in demultiplexer 418 (FIG. 4-B and FIG. 5-B) into channels 421, and the output ports 624 transmit signals carrying TDM data to sink nodes 120B through channels 423 which are multiplexed in multiplexer 488 onto downstream WDM links 450 (FIG. 4-B and FIG. 5-B). The interconnection of input ports 614 to output ports 624 is effected by a slave controller 650 associated with the optical switch 430 or 530.

The master controllers 590 of the optical switches 530 of a given core node 140D (FIG. 5-B) are interconnected by an internal bus (not illustrated). Each master controller 590 has at least one dual port (not illustrated) that includes a sender and a receiver to enable communications with other master controllers 590 through said internal bus. In a given core node 140D, the master controller that includes a bit-rate-allocation module 425 receives the bitrate-allocation requests from each subtending edge node 120 that connects to the core node 140.

In a core-node 140D, the bit-rate-allocation module 425 translates the bitrate requirement of a node pair into a number of time slots per TDM frame and may divide the determined number of time slots per TDM frame among the space switches 530 of the core node 140D.

Path Selection

Each source node 120A determines the required bitrate allocation for its traffic destined to each sink node 120B, selects a core node 140, and sends a bitrate-allocation request to a respective master controller of the selected core node 140 which verifies the availability, or otherwise, of paths having a sufficient vacancy to accommodate the required bitrate and sends a reply to the edge node. In a core node 140C or 140D having parallel space switches, a path between a source node 120A and a sink node 120B is defined by a selected space switch 520/530 in a selected core node 140C/140D. A source node 120A may select several parallel paths to a given destination sink node 120B through a single core node 140 or through several core nodes 140.

Path Setup

Figure 2:
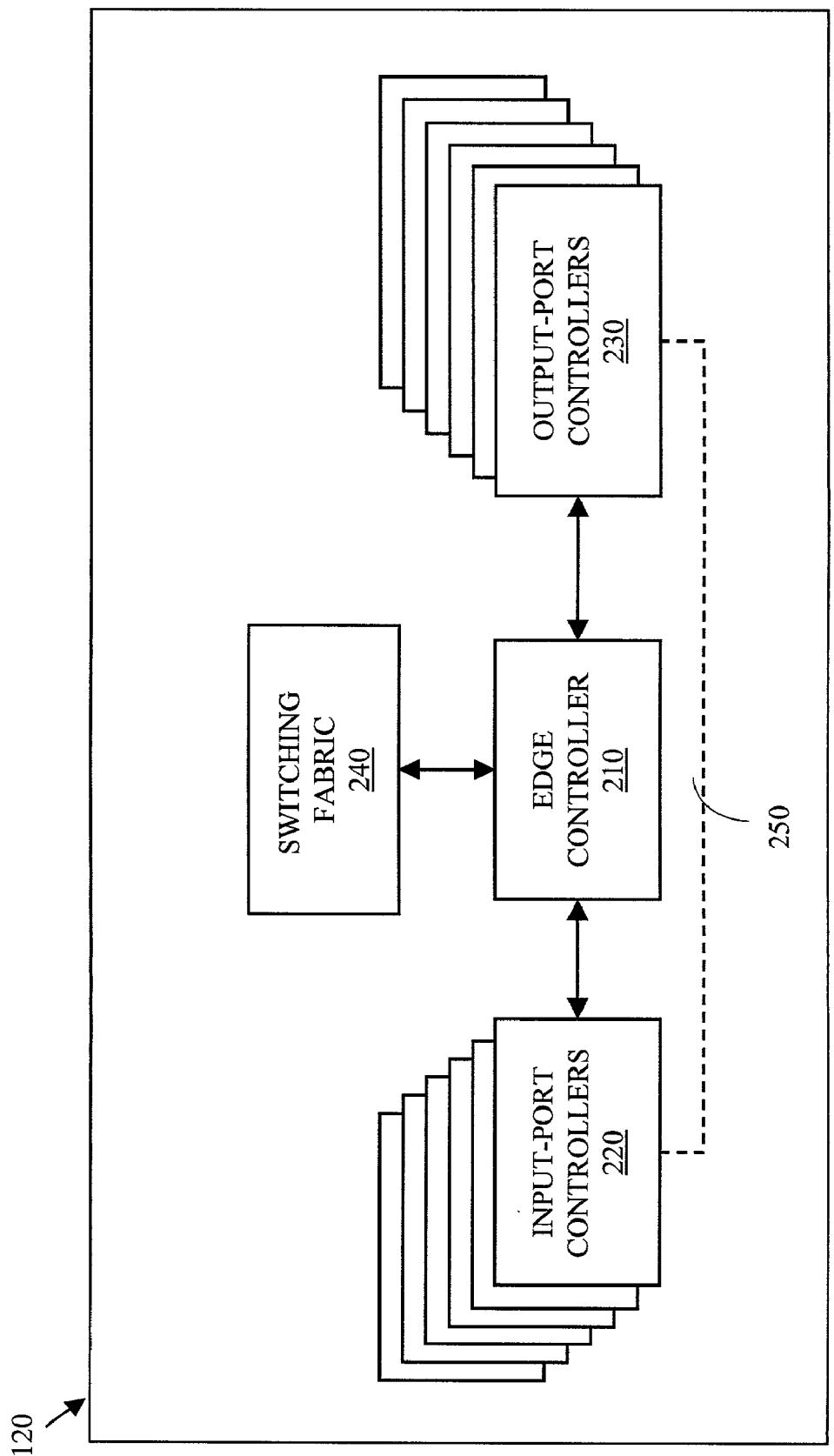
FIG. 2 illustrates the main components of an edge node in the data network of FIG. 1.

As described earlier, an edge node 120 comprises a source node 120A and a sink node 120B. Preferably, the source node 120A and the sink node 120B are integrated and share a common controller. FIG. 2 illustrates the main components of an integrated edge node 120 including input-port controllers 220, output-port controllers 230, an edge-node controller 210 and an electronic switching fabric 240. Some of the input ports of an edge node 120, hereinafter called source ports, receive data from traffic sources (not illustrated) and the remaining input ports, hereinafter called receiving ports, may receive data from other edge nodes 120 or from core nodes 140. Some of the output ports, hereinafter called sink ports, deliver data to traffic sinks (not illustrated) and the remaining output ports, hereinafter called departure ports, send data to other edge nodes 120 or to core nodes 140. In an adaptive network, each edge node 120 is preferably allocated a route set to each destination edge node, a route set including at least one path (route) to a respective destination edge node. In this disclosure, a path (route) in a route set is established through a core node 140. Preferably, a route set includes several paths, through at least one core node. Each source node 120A continually determines the required capacity for its data traffic to each destination sink node 120B and may communicate with a core node 140 to request an increase, or to offer a decrease, in path-capacity allocation.

A core node 140 can be a channel-switching node 140A or 140C or a TDM-switching node 140B or 140D. An edge controller 210 communicates with a core-node controller under the control of an output-port controller 230. If the core node is a channel switching node, 140A or 140C, a dedicated upstream control channel 422 emanating from one of the output ports of the edge node 120 carries control data to the core node 140A or 140C. A dedicated downstream control channel 424 carries control data from a core node 140A or 140C to an edge node 120. If the core node is a TDM switching node, 140B or 140D, control data are carried in-band, in dedicated time slots in a TDM frame.

At the core node 140A, the light beam in a WDM link 410 arriving from an edge node 120 and having W>1 wavelength channels, one of which being an upstream control channel 422, is demultiplexed at a demultiplexer 418 into the W individual wavelength channels. The upstream control channel 422 is directed to a master controller 480 through an optical/electrical (O/E) interface 402. The master controller is aware of the connectivity of the space switch 420 and is therefore able to determine whether a capacity increment can be accommodated. The modularity of a capacity increment is a single wavelength channel. Requests for capacity decrements are always accepted. A multiplexer 488, associated with a downstream WDM link 450 directed to an edge node 120, receives a control channel 424 from the master controller 480, through an electrical/optical (E/O) interface 404, and (W−1) wavelength channels from the switching fabric 420 and sends the multiplexed wavelength channels through downstream WDM link 450 to a respective edge node 120. With an adaptive-configuration discipline according to the present invention, the master controller 480 determines the instant of time at which a change in a capacity allocation is to be exercised. An edge node continues to use each of its current capacity allocations and starts to use new capacity allocations at a reconfiguration time instant that it receives from the master controller 480.

The control communications between an edge node 120 and a channel-switching core node 140C also take place through a dedicated upstream control channels 422 and a dedicated downstream control channel 424 as illustrated in FIG. 5-A. The main difference in the control signal exchange between an edge node 120 and the two channel-switching core nodes 140A and 140C is that the (W−1) channels connect to one space switch 420 in arrangement 140A but to separate (W−1) space switches 520 in arrangement 140C.

At the core node 140B, the light beam in an upstream WDM link 410 arriving from an edge node 120 and having multiple wavelength channels is demultiplexed at a demultiplexer 418 into its individual wavelength channels. The numbers of wavelength channels in different incoming WDM links need not be equal. The data carried by each of the wavelength channels is organized at the source edge node 120 into a TDM frame having a specified number, S>1, of time slots. At least one of the W channels arriving from an edge node has at least one time slot that carries control data. The control time slots from all incoming WDM links 410 are timed so that they can be switched successively to a master controller 490. The number S of time slots per TDM frame is preferably selected to be at least equal to the number L of upstream WDM links 410. The master controller, therefore, would need only have one control channel 492 from the switching fabric 430 carrying control data from all incoming WDM links 410. If the number L of incoming WDM links, or if the total number of control time slots, exceeds the number of time slots per TDM frame, then two or more control channels 492 can be provided. The master controller sends control data to the edge nodes 120 through outgoing WDM links 450. The control data from the master controller 490 to a given edge node 120 may require more than one control time slot per TDM frame and the control time slots in any outgoing link 450 need not be assigned to a single wavelength channel.

The control-data exchange between an edge node 120 and a TDM-switching core node 140D is also done through designated time slots in a TDM frame, as in the case of core node 140B. The main difference in the control signal exchange between an edge node 120 and the two TDM-switching core nodes 140B and 140D is that master controller 490 connects to a single space switch 430 in a core node 140B, through one or more control channels 492/494, while a master controller 590 is associated with each space switch 530 in a core node 140D through control channels 492/494. It is important to note that the capacity-adaptation requests send by the edge nodes 120 can be sent to any of the master controllers 590, because all the master controllers 590 of a core node 140D can communicate through an internal bus (not illustrated). However, as described earlier, all such requests are directed to a bit-rate-allocation module 425 included in a designated master controller 590A. The division of capacity allocation, and connection scheduling computational effort, among the master controllers 590 is not described in this disclosure. It is preferable that each master controller 590 be provided with timing circuitry to enable time locking each edge node 120, subtending to a core node 140D, to each space switch 530. The requirement for time-locking to each individual space switch 530 arises from the varying propagation delays of the different wavelengths within the same incoming WDM link 410. The propagation-delay difference within the same WDM link is relatively small. However, it must be offset if the duration of a time slot in a TDM frame is comparable to the maximum propagation-delay difference in a WDM fiber link 410. This requirement can be relaxed if the space switches 530 are electrical and each has input data buffers.

Referring to FIGS. 5-A and 5-B, a master controller 580 or the assembly of master controllers 590 determines the connectivity of the space switch 520 or 530 and communicates its decision back to respective edge nodes. The granularity of a capacity increment is a wavelength channel in the space switch 520 or a single time slot in the space switch 530. Thus, if a TDM frame has 128 time slots, then the granularity is ($\frac{1}{128}$) of the capacity of a wavelength channel. This is roughly 80 Mb/s for a wavelength channel modulated at 10 Gb/s.

It is noted that the connectivity-scheduling computational effort in the case of a TDM switch is higher than that of a channel switch of equal total capacity. Fine time-slot granularity requires more intensive computations in comparison with wavelength channel granularity. It is therefore preferable, as described earlier, that each master controller 590 computes the connectivity schedule of its space switch 530. The computation would be based on bit rate allocations granted by the bit-rate-allocation module 425 included in a master controller 590A.

A core node 140 may be reconfigured periodically. If, in a given reconfiguration process, the bit-rate-allocation module 425 associated with a master controller 480, 490, or 580, or the assembly of master controllers 590 fails to allocate the required capacity for a given path, then one of two policies may be adopted. According to the first policy, the bit-rate-allocation module 425 sends a rejection notification to the edge node that originated the request for capacity-allocation increment, an increment being a wavelength channel, a time slot per TDM frame, or a multiplicity of either. The edge may then repeat the request at a later time. According to the second policy, the bit-rate-allocation module 425 automatically attempts to accommodate the request during a subsequent reconfiguration process.

Core Nodes with Input Buffers

The methods and apparatus of the present invention, devised for a network employing bufferless core nodes, which can be optical core nodes or electronic core nodes, can also apply to a core node equipped with input-buffers. If each input buffer can store 10 kilobytes, for example, and the input data rate is 10 Gb/s, then an alignment discrepancy of as much as 8 microseconds of arriving data can be tolerated. The time-locking function described above is still required, given that the propagation-delay differentials from different subtending edge nodes can be as high as a 100 milliseconds. However, a tolerance time-window of 8 microseconds, to accommodate an alignment discrepancy, permits a simplified time-locking process in a WDM link where time-locking need be applied to only one wavelength channel, out of W>1 wavelength channels per WDM link, without having to account for the dependence of the propagation speed on wavelength.

Connectivity Changes

Figure 7:
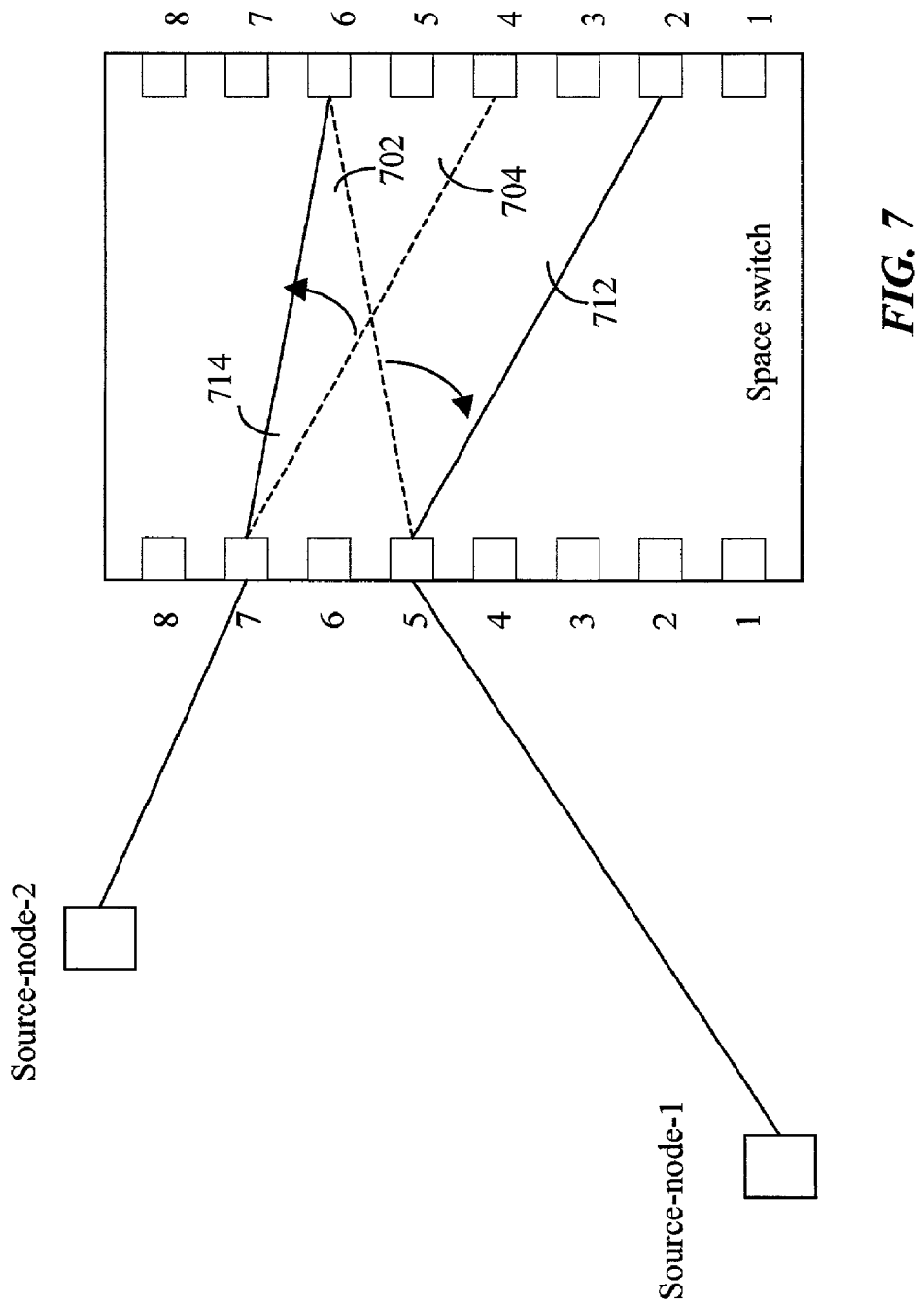
FIG. 7 illustrates connectivity changes in a reconfiguration step.

With reference to FIG. 7, a requirement to modify connectivity is illustrated. In channel switching, the current connectivity, indicated by dotted lines 702 and 704, remains in effect until changed in a subsequent connectivity change, i.e., in a core-node reconfiguration. In a TDM core node, the connectivity change illustrated in FIG. 7 could also represent connectivity in two successive time slots. In TDM, the space switch connectivity may change between successive time slots. In a first timeslot, source-node-1 is sending a signal from input port 5 to output port 6 over path 702, whereas source-node-2 is sending a signal from input port 7 to output port 4 over path 704. The source nodes then require different connectivity in the next timeslot, designated by solid lines 712 and 714 in FIG. 7. In particular, source-node-1 requires connectivity between input port 5 and output port 2 over path 712 and source-node-2 requires connectivity between input port 7 and output port 6 over path 714. Therefore, input port 7 will be connecting to the same output port to which input port 5 had been connected during the previous timeslot.

Consequently, it is imperative that there be time coordination within the core node. There must also be time co-ordination between a controller of the space switch in a core node to be reconfigured and the subtending source nodes. Strict time coordination is required when the core node is bufferless. This is particularly important when the source nodes are geographically distributed over a wide area where propagation delays to the core node may vary significantly.

Time-Locking

Time locking is needed to eliminate idle time during reconfiguration and to enable high link occupancy. In a wide-coverage network comprising electronic edge nodes interconnected by bufferless core nodes, each edge node may comprise a source node and a sink node, both sharing an edge-node controller and having means for data storage and managing data buffers. The transfer of data packets from source nodes to sink nodes via the core nodes requires precise time coordination to prevent contention at the bufferless core nodes, unless a relatively large guard time is allowed.

A first node X is said to be time locked to a second node Y along a given path if, at any instant of time, the reading of a time counter at node X equals the sum of a reading of an identical time counter at node Y and the propagation time, normalized to the time-counter period, along the given path from node X to node Y. The time counters at nodes X and Y have the same period. There may be several paths connecting the first node to the second node, and the paths may be defined by individual wavelengths in a fiber link or several fiber links. Due to the difference in propagation delays of different paths connecting the same node pair, time locking must be realized for the different paths individually. Due to dispersion, time locking of individual wavelength channels within the same WDM link may be required. When a first node is time locked to a second node along a given path, the given path is said to be time-locked. It is noted that the methods and apparatus of the present invention apply to both channel switching and TDM switching.

Within a network 100 illustrated in FIG. 1, all time counters have the same period and time-coordination can be realized through an exchange of time-counter readings between each source node and its adjacent core node, i.e., the core node to which the source node is connected. As described earlier with reference to channel switching (core nodes 140A or 140C), the time-counter reading, together with other control data, are carried by an upstream control channel 422, illustrated in FIGS. 4-A and 5-A. In TDM switching (core nodes 140B or 140D), the time-counter readings are carried in-band, alongside payload data destined to sink nodes. The sending of each time-counter reading must be timed to arrive at a corresponding core node during a designated time interval. The difficulty of securing time-coordination arises from two interdependent requirements. The first is that communicating a time-counter reading from a controller of a source node to a controller of a core node requires that the source node be time-locked to the core node, and the second is that time-locking a source node to a core node necessitates that a controller of the core node be able to receive a time-counter reading from the source-node controller during a designated interval of time. To initiate or restore time locking, a secondary mechanism is therefore required for directing upstream signals received from source nodes toward said master controller of the core node.

In a network where the edge nodes 120 and the core nodes 140 are collocated in a relatively small area, the propagation delay between any edge node 120 and a core node 140 can be substantially equalized, by equalizing the lengths of fiber links for example. In a network of wide geographic coverage, each edge node must adaptively time lock to each of the core nodes to which it connects.

Time locking an edge node to a core node means that a time counter at the edge node is time locked to a time counter at the core node. A time counter at an edge node is preferably an up-counter and a time-counter at a core node is preferably a down counter, the two counters have the same cycle duration. Using a 28-bit time counter, for example, driven by a clock of a clock period of 20 nanoseconds, the duration of the time-counter cycle would be about 5.37 seconds ($2^{28}$ times 20 nanoseconds). The reading of an up-counter at an edge node increases, with each clock trigger, from 0 to 268,435,455 (0 to $2^{28}-1$) and the reading of a time counter at a core node decreases, with each clock trigger, from 268,435,455 to 0. If the edge-node controller sends a timing message, when its reading is K1, to a core node, and the reading of the down-counter of the core node at the instant of receiving the timing message is K2, then the edge-node controller must reset its up-counter to zero when the up-counter reading reaches [K2+K1] modulo $2^B$, B being the wordlength of the time counter (B=28 in the above example). If K2+K1=$2^B$−1, the edge node is already time locked to the core node.

Edge-Node Grouping

Figure 8:
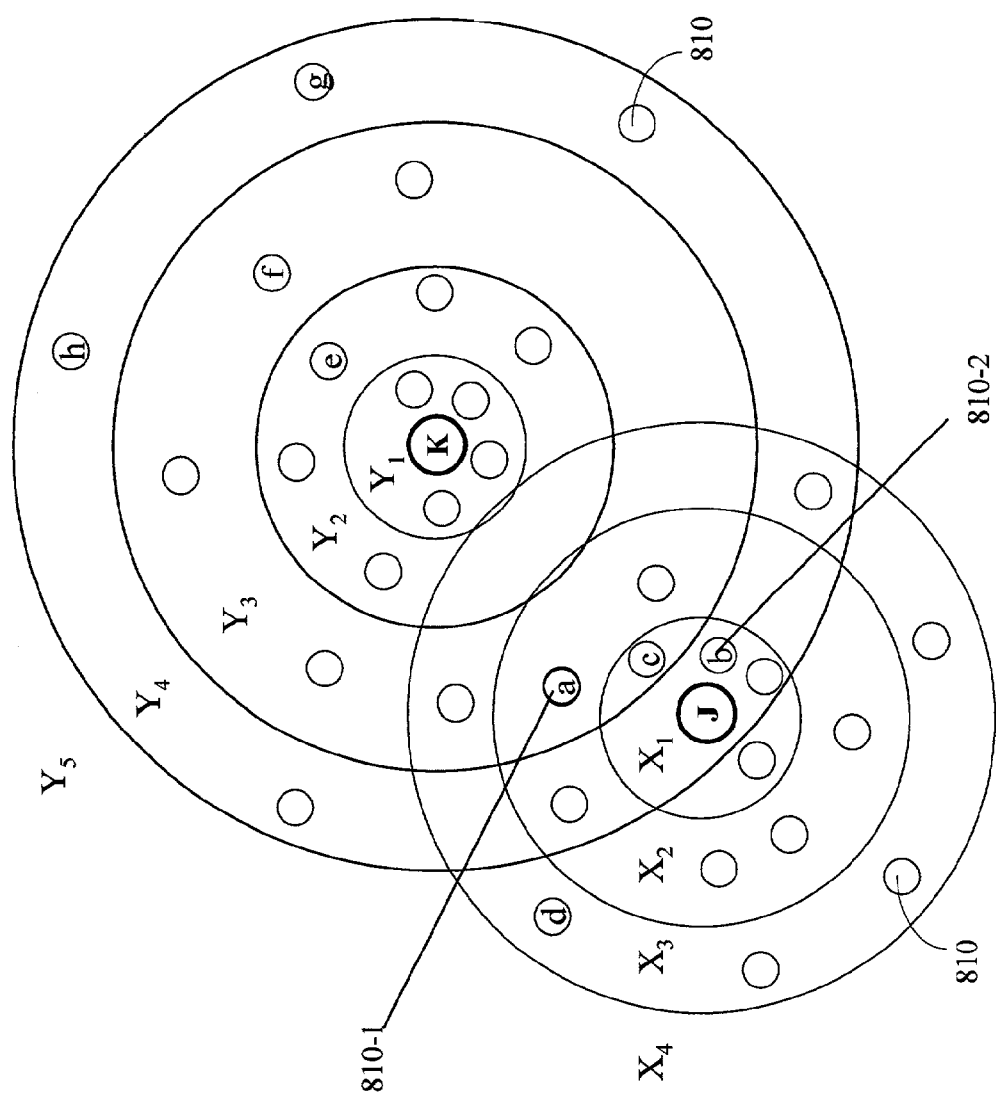
FIG. 8 illustrates a network having a plurality of nodes separated into groups in accordance with an embodiment of the present invention.

FIG. 8 illustrates a network having a plurality of nodes 810, with two reference nodes labeled J and K designated as connecting nodes through which the remaining nodes may interconnect. The nodes J and K can be reconfigured to meet changing traffic conditions. In an embodiment of the present invention, nodes J and K are preferably core nodes, although an edge node can be used as a connecting node for pairs of other edge nodes in addition to serving the traffic of its own traffic sources and sinks. Node J divides the remaining network nodes, excluding node K, into four groups according to a specific merit criterion, for example proximity. The groups are labeled X1, X2, X3, and X4. Likewise, node K divides the other nodes, excluding node J, according to the same, or other, merit criterion, into five groups. The groups are labeled Y1, Y2, Y3, Y4, and Y5. The node labeled 'a' belongs to groups {X2, Y3} with respect to the reference nodes J and K, i.e., it belongs to group X2 with respect to connecting node J and group Y3 with respect to connecting node K. Similarly, the nodes labeled 'b', 'c', and 'd', belong respectively to groups {X1, Y4}, {X1, Y3}, and {X3, Y5}, with respect to connecting nodes J and K respectively.

Figure 9:
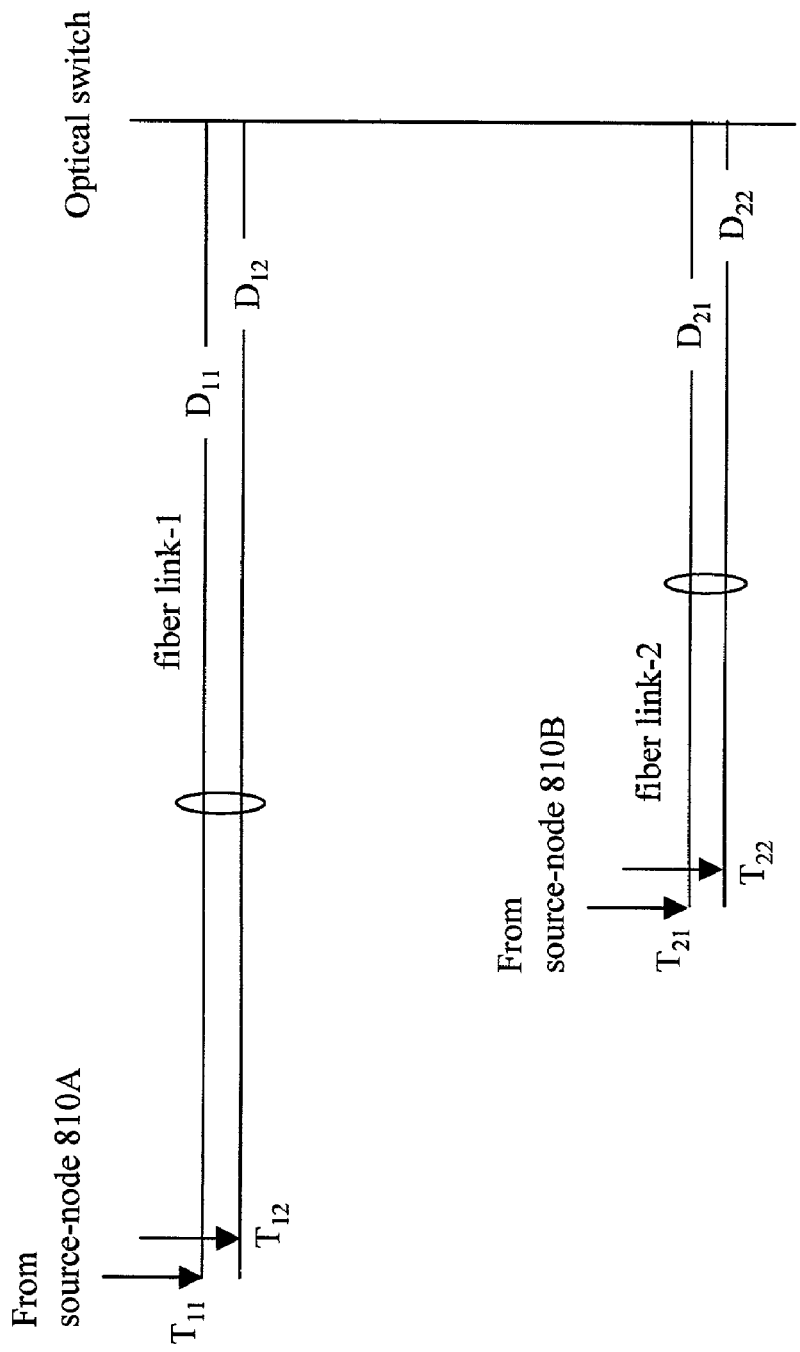
FIG. 9 illustrates the time-locking principle in a channel-switching network for use with an embodiment of the present invention.

FIG. 9 illustrates such a situation wherein signals from source edge node 810-1 and from source edge node 810-2 (both shown in FIG. 8) are required to arrive at a bufferless reference core node, comprising optical switches for example, at exactly the same time. However, nodes 810-1 and 810-2 are at different physical distances away from the reference core node and, as such, it is necessary to account for the delay experienced by signals sent from each of these nodes to said reference core node. Furthermore, any of the nodes 810 may send signals to said reference core node over a WDM link having a plurality of wavelengths, traveling at slightly different speeds. Though the speed difference can be relatively small, it is necessary to account for the differences in time delay even for WDM signals carried by the same WDM link.

In FIG. 9, two signals are being sent over two wavelength channels in fiber link-1 from source node 810-1, leaving at times $T_{11}$ and $T_{12}$, with propagation delays of $D_{11}$ and $D_{12}$ respectively. Similarly, two signals are being sent over fiber link-2 from source node 810-2, leaving at times $T_{21}$ and $T_{22}$, with delays of $D_{21}$ and $D_{22}$ respectively. For each of these signals, from the source nodes 810-1 and 810-2, to arrive at the reference core node at exactly the same time, the following condition must be satisfied:

$$T_{11}+D_{11}=T_{12}+D_{12}=T_{21}+D_{21}=T_{22}+D_{22}=Q,$$

Q being the target reconfiguration time at the reference core node. The equality above illustrates the concept of time locking, as described earlier.

Figure 10:
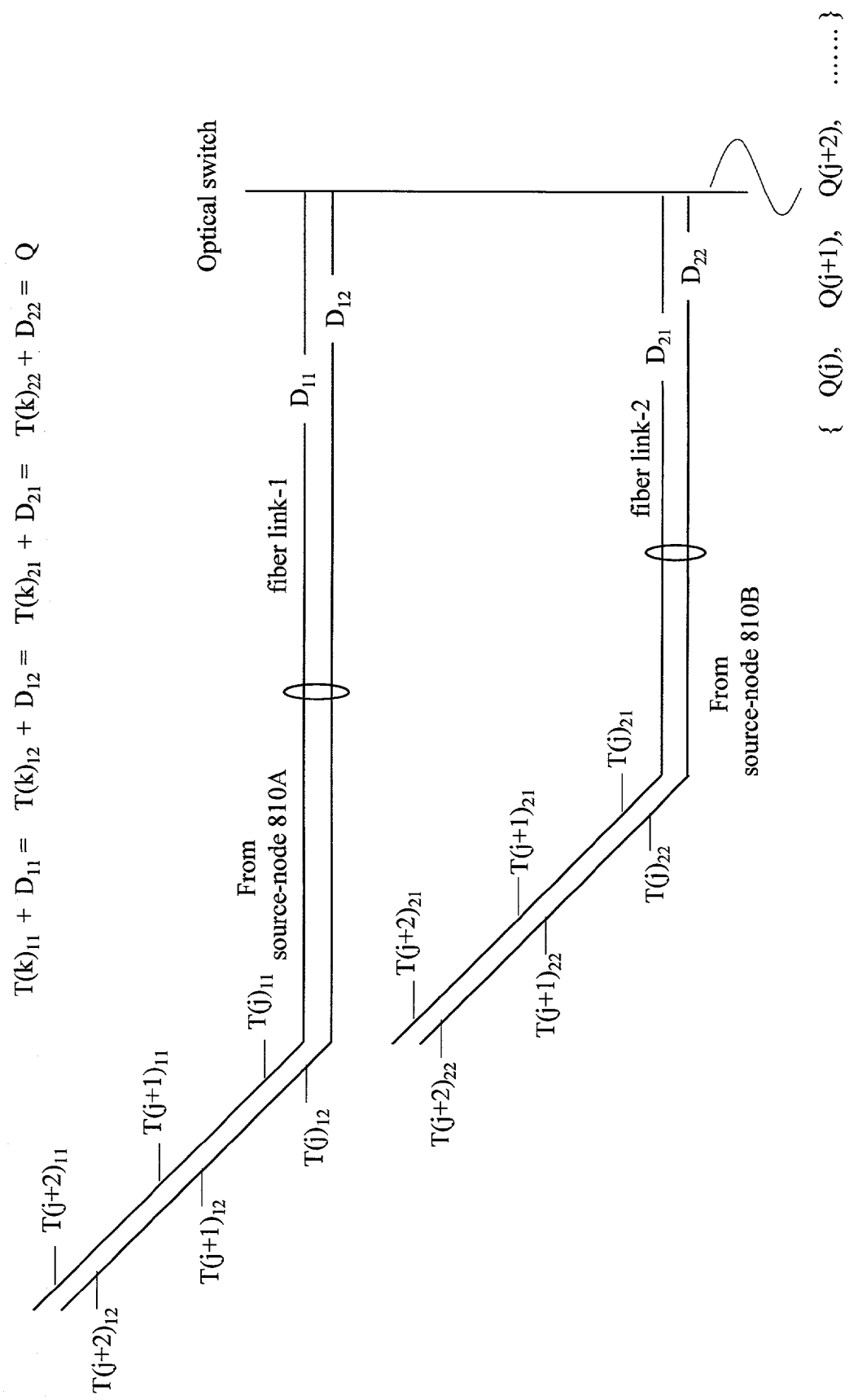
FIG. 10 illustrates the time-locking principle in a TDM switching network for use with an embodiment of the present invention.

In light of the above requirement, a controller of the bufferless reference core node would send a message beforehand to each of its subtending nodes, that have requested capacity-allocation increments, to schedule transmission of data through different channels at different starting times. FIG. 10 illustrates a similar situation to that in FIG. 9, but with TDM signals being sent over each wavelength channel. For example, the signal from source node 810-1 being transmitted with a delay $D_{11}$ now consists of a succession of time-slotted signals, three of which being illustrated in FIG. 10, each corresponding to a data unit, being sent in succeeding time slots denoted $T(j)_{11}$, $T(j+1)_{11}$, $T(j+2)_{11}$, where the unit of time delay is a time slot in a TDM frame. The time slot at which the $k^{th}$ data unit in a TDM frame is transmitted is denoted $T(k)_{11}$. In this case, the time-locking condition for each wavelength channel now depends on a plurality of distinct transmissions being sent successively and experiencing the same propagation delay. The delay-equalization condition may be rewritten as:

$$T(k)_{11}+D_{11}=T(k)_{12}+D_{12}=T(k)_{21}+D_{21}=T(k)_{22}+D_{22}=Q(k),$$

Q(k) being the target time for receiving the $k^{th}$ data unit of a TDM frame at the respective reference core node.

To enable switching at the bufferless reference core node, the succession of signals must arrive at the switch at the same time, or within an acceptable time difference, 10 nanoseconds for example. This necessitates that each edge node be time locked to each reference core node to which said edge node is connected.

When edge-node 810-1 sends a timing message to the master controller of a core node 140 illustrated in FIGS. 4-A, 4-B, 5-A, and 5-B, said master controller records node 810-1's time-counter reading and the corresponding reading of a master time counter of the master controller. The two readings are then sent by the master controller to the edge node 810-1. The edge controller of edge node 810-1 receives said corresponding reading of the time counter of said master controller and resets its own time counter accordingly, as described earlier. This process may be repeated periodically in order to maintain proper time locking in an environment where propagation-delay variation could occur. As described earlier, all time counters in the network have the same period and all are synchronized in a conventional manner. It is important to note that time-locking relates to timing of events at different nodes while synchronization relates to phase locking of clocks.

Referring to FIG. 1, each core node 140 is connected to at least one edge node 120. A core node reconfigures in response to traffic variation by modifying at least one of its internal connections. The reconfiguration process may be cyclic, with a 200-millisecond cycle duration for example. Because some edge nodes can be closer to a reconfiguring core node (reference core node) than others, messages sent from the core node 140 may arrive at the subtending edge nodes 120 at different times. The core node must be able to send a message announcing that it will reconfigure itself at a particular time T* and transmit a new connectivity schedule to each affected edge node. Each affected edge node would start to follow the new connectivity schedule precisely when its own time-counter reading equals T*. This is enabled by the time locking technique described above, using up-counters at the edge nodes and down counters at a reference core node. The duration of the time-counter cycle is preferably selected to be substantially larger than the highest reconfiguration latency in the network 100.

Multi-Phase Reconfiguration

With a potentially high variance of the reconfiguration latency among a plurality of edge nodes requesting path-capacity adjustment, an edge node having a small reconfiguration latency, of 1 millisecond for example, would have to wait for an edge node that has a high reconfiguration latency, of 200 milliseconds for example. It is therefore advantageous, according to an embodiment of the present invention, to implement a multi-phase, reconfiguration process where an edge node having a small reconfiguration latency can reconfigure at a fast pace without negatively affecting the reconfiguration process of any other edge node. The reconfiguration process can be implemented in two or more phases. As such, it would be beneficial to group all of the edge nodes 120 according to their relative reconfiguration latency with respect to a reference core node 140. Although this grouping is preferably based on the reconfiguration latency, it may be based on other parameters. For example, an edge node that has a reconfiguration latency, with respect to a reference core node 140, of one millisecond may elect to reconfigure less frequently, with larger time intervals between successive reconfigurations.

The space-time diagram of FIGS. 11-A to 11-D relate to five edge nodes labeled edge-node 1 to edge-node 5. The horizontal axis represents time in arbitrary units, and the vertical axis represents the location of the edge-node 1 to edge-node 5, relative to the reference core node. In the example of FIGS. 11-B to 11-D, two edge nodes belonging to edge-node groups labeled G1 and G5 are illustrated.

FIG. 11-A illustrates one manner in which a core node polls the edge nodes to determine the round trip delay associated with each edge node. The reconfiguration latencies of edge nodes labeled edge-node 1 to edge-node 5 are illustrated as $\Delta 1$ to $\Delta 5$ in FIG. 11-A. In the polling process, the core node sends a message to an edge node labeled edge-node 2 for example, at a given instant of time T, to arrive at said edge node at a time $T+Y_{2,1}$; the edge node responds after a delay period at least equal to its anticipated required reconfiguration-processing time, $Y_{2,0}$. In order to determine this anticipated required reconfiguration-processing time, it is advantageous to consider a worst-case scenario. The edge node may determine a priori an upper bound of the time required to execute a reconfiguration process. Once the anticipated required reconfiguration-processing time has been determined, a reply is sent by the edge node to the core node to arrive after a time period of $Y_{2,2}$. The total reconfiguration latency, $\Delta_2$, for edge node 2 with respect to the core node is then: $\Delta_2 = Y_{2,1} + Y_{2,0} + Y_{2,2}$, as illustrated in FIG. 11-A. Preferably, the reply sent by the edge node to a core node should also include the time period $Y_{2,0}$, to enable computing the round-trip propagation delay only which may be needed for other management functions.

In the example of FIG. 11-A, it is observed that while the round-trip propagation delay, $(Y_{4,1}+Y_{4,2})$, between the reference core node considered and edge-node 4 is lower than the round-trip propagation delay, $(Y_{5,1}+Y_{5,2})$, between the reference core node and edge-node 5, edge-node 4 has a higher reconfiguration-processing time in comparison with edge node 5:

$$(Y_{4,1}+Y_{4,2}) < (Y_{5,1}+Y_{5,2}), (Y_{4,0} > Y_{5,0}), \text{ and } \Delta 5 < \Delta 4.$$

This polling process, executed by a reference core node, is repeated for each edge node, and the resulting measurements are collected at the core node. Configuration periods $P_1$ to $P_H$, may be preset by a network-management function. The configuration period for a group is the interval between successive instants of reconfiguration opportunity as described earlier. Alternatively, the measurements, $\Delta j$, $0 < j \leq n^*$, where the subtending edge nodes of a reference core node are numbered sequentially from 1 to $n^*$, may be used to determine appropriate configuration periods $P_1$ to $P_H$. At this point, the core node should divide the edge nodes into groups based on either the pre-selected configuration periods, or configuration periods derived from a histogram of the delay measurements $\Delta j$, $0 < j \leq n^*$. The same process is executed at other re-configurable reference core nodes. The polling process to determine the reconfiguration latencies is not time critical and may, therefore, be implemented in software. Preferably, the polling process should be applied to all edge nodes.

Each of the edge nodes in an edge-node group connects to an input port in a corresponding input-port group in a space switch 420, 430, 520, or 530. Hereinafter, the edge-node group of shortest configuration period is referenced as G1, the edge-node group of second shortest configuration period is referenced as G2, and so on, so that the group of largest configuration period is referenced as $G_H$. Group $G_H$ having the largest configuration period, $P_H$, is also said to be the highest group. With H=5, for example, G5 is said to be higher than G4, G4 is said to be higher than G3, and so on.

A boundary edge node in an edge-node group, with respect to a reference core node, is defined as the edge node in the group that has the highest sum of round-trip propagation delay with respect to the reference core node and the time required by the edge node to implement a new schedule. In FIGS. 11-B to 11-D, edge-node-2 is a boundary edge node for a group G1 and edge-node-4 is a boundary edge node for a group G5. There can be two or more boundary edge nodes in an edge-node group.

The reconfiguration latency is defined according to either of two methods of timing the reconfiguration of an edge node with respect to a reference core node. In a first method, at the start of a configuration period, a connectivity schedule is computed by the core node then communicated to respective edge nodes which modify their internal connectivity accordingly. In a second method, the computation of a connectivity schedule for a configuration period is performed concurrently with the transfer of a connectivity schedule, to respective edge nodes, for a previous configuration period. The use of the first method simplifies time coordination.

In the first method, the reconfiguration latency is determined as the sum of:
(1) the interval of time, $\delta_g$, required by the core-node controller to compute a connectivity schedule for edge-node group g (input-port group g), and
(2) an interval of time, $\Delta_e$, determined as the sum of the round-trip propagation delay between the core node 140, and a boundary edge node 120-e, plus the processing time required by the boundary edge node 120-e to modify its internal switching pattern to correspond to a new connectivity schedule that the edge node 120-e receives from the core node.

In the second method, the reconfiguration latency is determined as the larger of $\delta_g$, and $\Delta_e$.

The first method is preferred when $\delta_g$ is much smaller than $\Delta_e$, which would be the case for higher groups having a large round-trip delay to the reference core node. The first method is illustrated in FIG. 11-B for two edge nodes: one labeled edge-node 2 and belonging to an edge-node group labeled G1, and the other labeled edge-node 4 and belonging to an edge-node group labeled G5. The configuration period for an edge-node group must equal or exceed the reconfiguration latency for any edge node in the edge-node group. Thus, P1≧(δ1+Δ2) and P5≧(δ5+Δ4).

The second method is illustrated in FIGS. 11-C and 11-D for edge-nodes 2 and 4 mentioned above. FIG. 11-C illustrates the case where the sum, Δ2, of the round-trip propagation delay between a core node and a boundary edge node (edge-node 2) plus the reconfiguration processing time at the boundary edge node is larger than the time, δ1, required by the core node to compute the connectivity schedule, and likewise with respect to a boundary edge-node 4. FIG. 11-D illustrates the case where the time δ1 required by the core node to compute the connectivity schedule for the respective input-node group exceeds the sum Δ2 of round-trip propagation delay, between the core node and edge-node 2 that belongs to G1, and the reconfiguration processing time at edge node 2.

Threshold Tables

Each core node may select an appropriate number of edge-node groups, and designate a reconfiguration-latency threshold for each group, independently from other core nodes. Each core node devises a 'threshold table' that contains the reconfiguration-latency threshold for each subtending edge-node group and the identities of the edge nodes belonging to each group. The reconfiguration-latency thresholds for the H edge-node groups are set to equal the configuration periods, $P_1$ to $P_H$.

In one embodiment, the number of edge-node groups may be selected a priori, and the associated thresholds are predetermined and placed in the threshold table to be used for paced reconfiguration where a master controller of a reference core node 140 divides the edge nodes according to a respective threshold table. The core nodes 140 may use different threshold tables. For example, in FIG. 8, reference core node J, functioning as a connecting reference core node, divides its subtending edge nodes into four groups, and the outer boundary of each group corresponds to a pre-selected threshold. Reference core node K, functioning as a connecting core node, divides its subtending edge nodes into five groups, with corresponding thresholds defining the boundaries. Note that the boundary of the outer-most group is a default value determined to exceed the highest possible reconfiguration latency; 10 seconds for example. An edge node may elect not to participate in the adaptive configuration process, in which case its connectivity to selected other edge nodes would remain unchanged. An edge node that does not send capacity-allocation requests to a core node would not be considered in the reconfiguration process.

In another embodiment, the number of edge node groups and the corresponding thresholds are determined by analyzing reconfiguration-latency measurements. A threshold table can then be constructed and the edge-node grouping can be performed as described above with respect to the predetermined thresholds.

Connectivity Schedules for Edge-Node Groups

Figure 12:
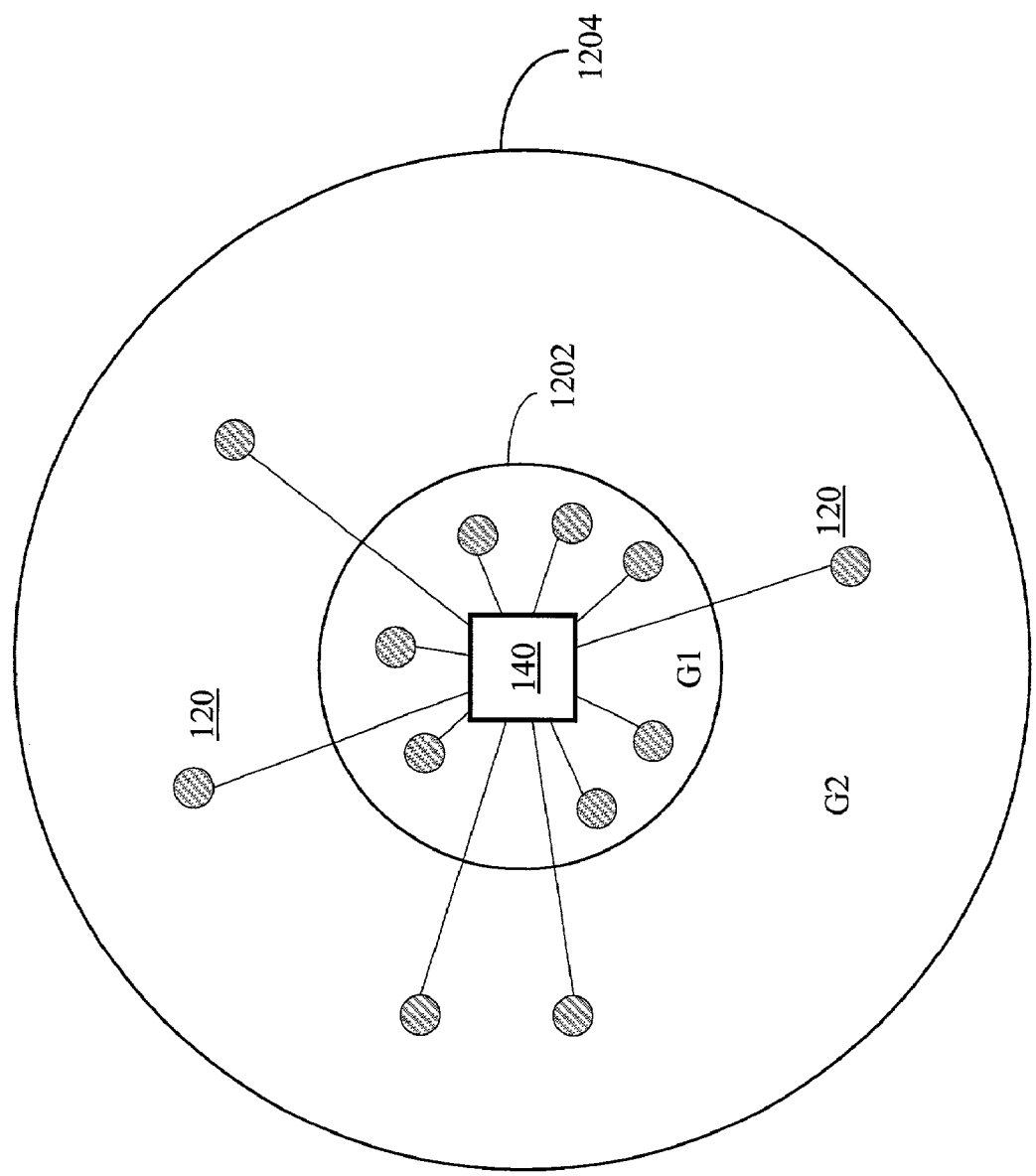
FIG. 12 illustrates the grouping of edge nodes in accordance with an embodiment of the present invention.

FIG. 12 illustrates an example of a preferred grouping of edge nodes. In this figure, core node 140 has selected thresholds corresponding to boundaries 1202 and 1204. Boundary 1202 divides the edge nodes into two groups. Any number of thresholds and groups may be selected, depending on the number of nodes and the network requirements. In FIG. 12, all edge nodes 120 determined to be within the reconfiguration-latency threshold 1202 are grouped into group G1. The nodes in group G1 are able to reconfigure within a time less than the reconfiguration-latency threshold 1202. All edge nodes 120 beyond threshold 1202 are grouped into group G2. As will be described below, the configuration periods, which are the intervals between successive reconfiguration opportunities for the edge-node groups with respect to a reference core node, must bear a certain relationship to each other in order to increase edge-node reconfiguration opportunities.

It is important to note that the edge nodes in group G2 have a round trip delay between thresholds 1202 and 1204. The difference between these two thresholds may be quite significant. For example, group G1 may be able to reconfigure every 1 millisecond, whereas group G2 may only be able to reconfigure every 4 milliseconds. In the example illustrated in FIG. 12, no edge node has a reconfiguration latency exceeding 4 milliseconds. It is advantageous, in a preferred embodiment, to allow the nodes in group G1 to be eligible to be reconfigured any time the nodes in group G2 are eligible to be reconfigured. The threshold 1202 is preferably set such that group G1 of edge nodes comprises a larger number of edge nodes than group G2 of edge nodes. When the subtending edge nodes of a reference core node are divided into more than two groups, it is preferable that the reconfiguration-latency thresholds be selected such that a group defined according to a given threshold contains more edge nodes than a group defined according to a threshold that is higher than said given threshold.

Figure 13:
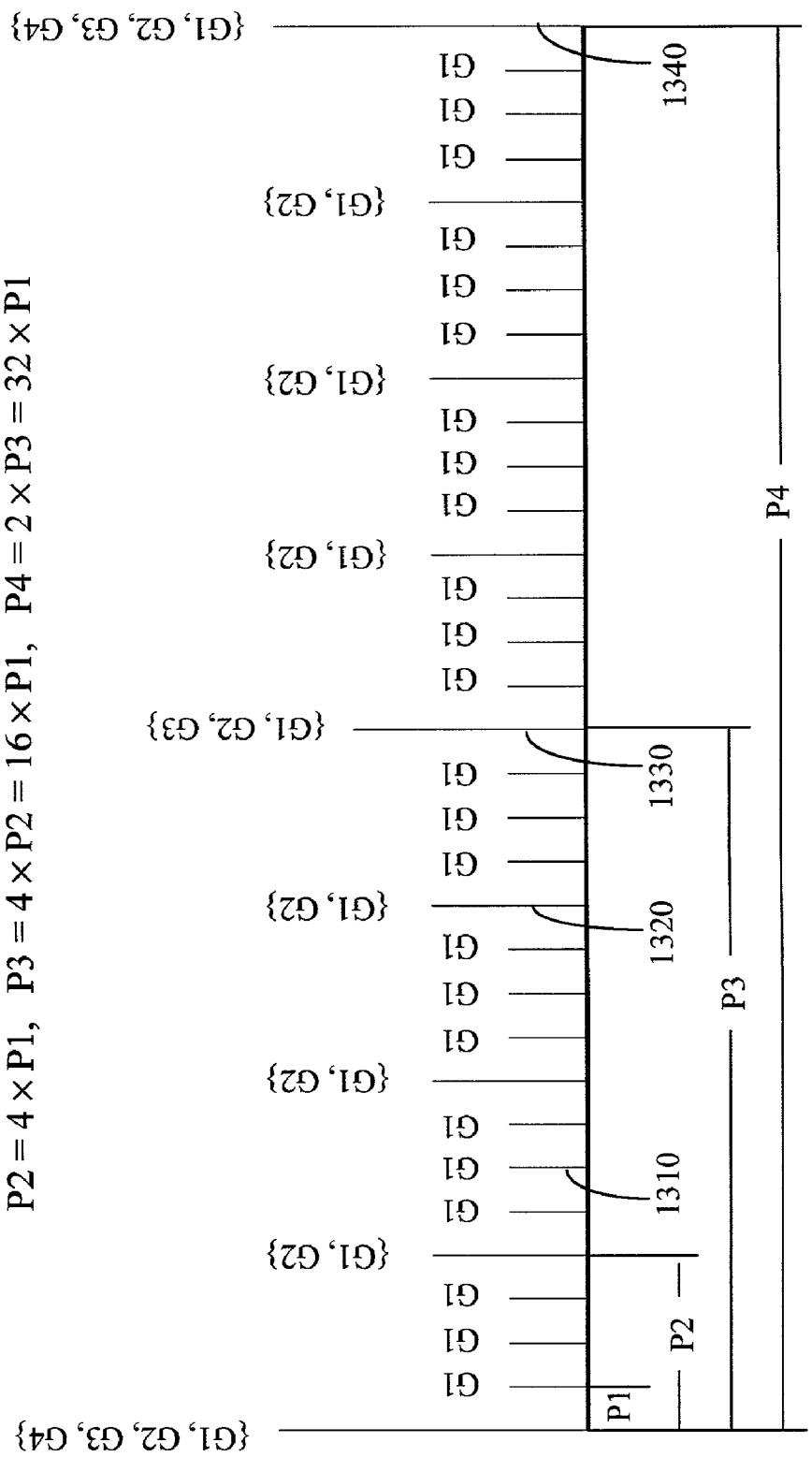
FIG. 13 illustrates the timing of reconfiguration for different edge-node groups with respect to a given core node in accordance with an embodiment of the present invention.

Referring to FIG. 13, a specific example is presented wherein four different groups G1, G2, G3 and G4 have been created. The reconfiguration-latency thresholds for the groupings are 1 millisecond, 4 milliseconds, 16 milliseconds, and 32 milliseconds, respectively. In order for the nodes in group G1 to be eligible to be reconfigured any time the nodes in group G2 are eligible to be reconfigured, the thresholds are preferably set such that each succeeding threshold is an integer multiple of the previous threshold. This relationship may be stated as $P_j = m_j \times P_{j-1}$, for j>1, where for group j, $P_j$ is a reconfiguration-period and $m_j$ is any integer greater than 1 for j>1. In the example of FIG. 13, $m_2=4$, $m_3=4$, and $m_4=2$. Thus, $P_2=4\times P_1, P_3=4\times P_2=16\times P_1$, and $P_4=2\times P_3=32\times P_1$. The smallest configuration period, P1, must at least equal the computation time of a new configuration of a reference core node. The configuration period $P_1$ with respect to a reference core node is preferably selected to be the larger of the highest reconfiguration latency of the edge nodes forming the inner-most group G1 and a preset lower bound that would be selected according to the processing capability of a master controller 480, 490, 580, or the assembly of master controllers 590 of the reference core node 140.

In this preferred exemplary embodiment, group G1 is selected to comprise a relatively large number of nodes. This is because a channel or a timeslot may only be reassigned to a particular node when it is released by another node, and when a group comprises a large number of nodes, the opportunity of resource exchange increases, leading to a higher probability of successfully establishing new connections. Thus, referring to FIG. 13, group G1 may reconfigure at instants 1310, 1320, 1330, and 1340, group G2 may reconfigure at instants 1320, 1330, and 1340, group G3 may reconfigure at instants 1330 and 1340, and group G4 may reconfigure at instants 1340.

Each input port in a space switch to be reconfigured is associated with an edge node 120, and more than one input port can be associated with one edge node 120. The input ports can then be divided into input-port groups, each corresponding to an edge-node group.

Figure 14:
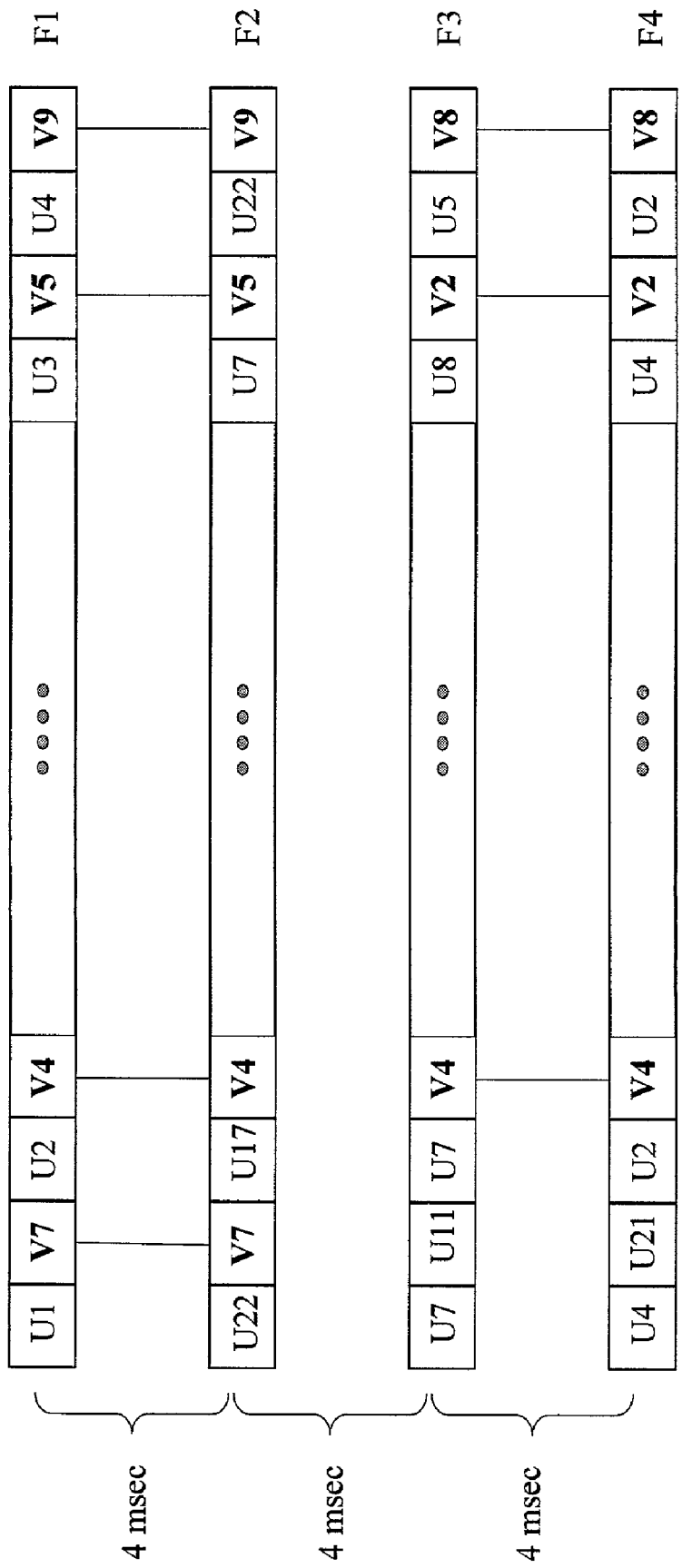
FIG. 14 illustrates a two-phase reconfiguration process according to an embodiment of the present invention.

FIG. 14 illustrates an example of a particular reconfiguration according to an embodiment of the present invention at a given core node with edge nodes being divided into two groups G1 and G2, which are reconfigured at configuration periods of $P_1=4$ milliseconds, and $P_2=8$ milliseconds. Four different configurations of a TDM frame, at an output port of a switching fabric of a core node 140B or 140D, are illustrated in FIG. 14. The four TDM frames are labeled F1, F2, F3, and F4. In this example, the TDM frame is reconfigured every 4 milliseconds. Thus, if the TDM frame period is 500 microseconds, for example, then each TDM frame is used for 8 successive TDM-frame periods before being eligible for reconfiguration, i.e., each of the TDM frames F1, F2, F3, and F4, in this example, is used repeatedly for eight TDM-frame periods. The number associated with each of the timeslots corresponds to an input port number in a space switch of a reference core node for the data contained therein.

The N input ports are divided into H input-port groups where input-port group $j, 1 \leq j \leq H$, has a pre-selected number $n_j$ of input ports. The number of edge nodes in an edge-node group j is less than or equal to the number $n_j$, because an edge node may connect to more than one input port. Input ports connecting to edge nodes belonging to group G1 are identified as $Uj, 1 \leq j \leq n_1$, while input ports connecting to edge nodes of group G2 are identified as $Vj$, $1 \leq j \leq n_2$, N being the number of input ports in the space switch. In the first reconfiguration, transition from TDM frame F1 to TDM frame F2 takes place. The time slots in TDM frame F1 assigned to input ports U1, U2, U3, and U4 are reassigned to input ports U22, U17, U7, and U22. Each of the time slots in TDM frame F1 assigned to input ports V7, V4, V5, and V9 remains assigned to the same input port. This is reflective of the fact that these ports belong to a group G2 of a larger reconfiguration-latency with respect to the space switch of the reference core node, and thus were not eligible for reconfiguration in the transition from F1 to F2. In the second reconfiguration process, transition from TDM frame F2 to TDM frame F3 takes place. Here, all of the nodes in groups G1 and G2 are eligible for reconfiguration. The time slots assigned to input ports U22, V7, U17, V4, U7, V4, U22, and V9 are now assigned to input ports U 7, U11, U7, V4, U8, V2, U5, and V8 respectively. It is noted that more than one time slot can be assigned to an input port. In the third reconfiguration, only the output ports in group G1 are eligible for reconfiguration, whereas those in group G2 are not and remain unchanged. The transition from TDM frame F3 to TDM frame F4 affects only edge nodes of group G1 and, hence, only the time slots assigned to input ports U7, U11, U7, U8, and U5 were reassigned to input ports connecting to edge nodes of group G1. Naturally, reconfiguration need not result in modifying the connectivity associated with each time slot in the TDM frame.

Figure 15:
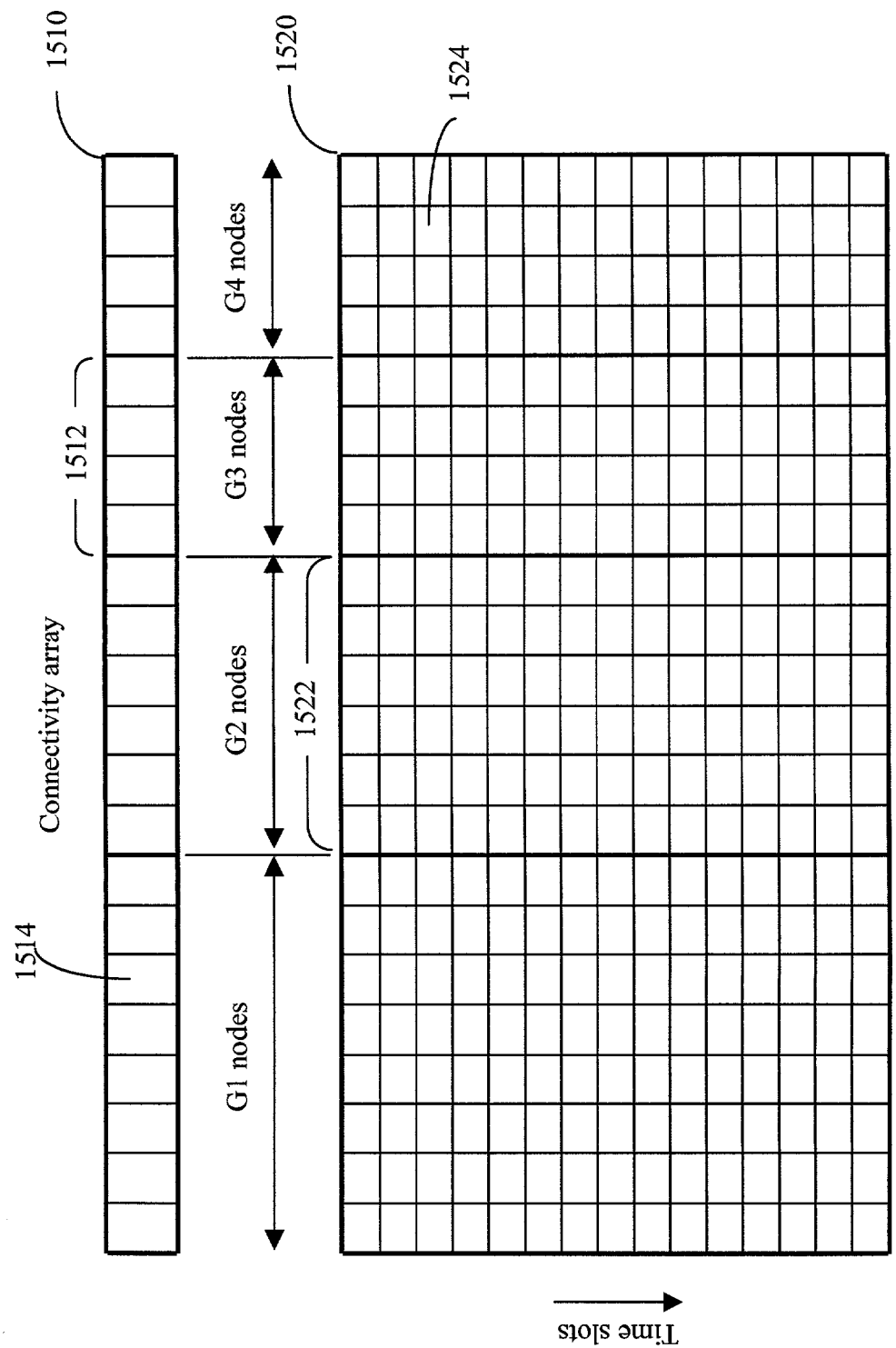
FIG. 15 illustrates a connectivity array for a channel-switching space switch and a connectivity matrix for a TDM-switching space switch, in accordance with an embodiment of the present invention.

FIG. 15 illustrates a connectivity array 1510 for a channel-switching space switch 420 or 520, and a connectivity matrix 1520 for a TDM-switching space switch 430 or 530, in accordance with embodiments of the present invention. The connectivity array 1510 indicates, for each input port of space switch 420/520, an identifier of the output port to which the input port should be connected. The connectivity array 1510 is used by a slave controller 640 to effect the connectivity of the space switch 420/520. The connectivity matrix 1520 indicates, for each input port of space switch 430/530, an identifier of the output port to which the input port should be connected during each time slot in a TDM frame. The connectivity matrix 1520 is used by a slave controller 650 to effect the connectivity of the space switch 430/530.

The connectivity array 1510 is logically divided into H sub-arrays 1512, H being the number of input-port groups. Likewise, the connectivity matrix 1520 is divided into H sub-matrices 1522. H is set equal to four in the example of FIG. 15. Each entry 1514 in connectivity array 1510 contains an identifier of an output port. Likewise, each entry 1524 in a connectivity matrix 1520 contains an identifier of an output port.

In the following description of the reconfiguration process, a connectivity array 1510 in a channel-switching core node 140 will be treated as a special case of a connectivity matrix 1520 where the number of time slots per TDM frame is one. Subsequently, a connectivity sub-array 1512 is treated as a special case of a connectivity sub-matrix 1522.

Each master controller 480, 490, 580, or 590 includes two complementary connectivity memories 1620 as indicated in FIG. 16-A. The two memories are identically structured, and each is segmented into H sections 1622. Each section 1622 holds a connectivity sub-matrix 1522 for each of H input-port groups, with each input-port group corresponding to an edge-node group. Connectivity memory 1620A contains, for each input-port group, either a current or a succeeding connectivity sub-matrix, where it contains current-connectivity data for some input-port groups and succeeding-connectivity data for the remaining input-port groups. Connectivity memory 1620B also contains, for each input-port group, either a current or a succeeding connectivity sub-matrix so that at any instant in time, for each input-port group, a current-connectivity sub-matrix is held in one of the two memories 1620 and a succeeding-connectivity sub-matrix is either already held in the other memory 1620, or is forthcoming, being computed by a core node controller. It is noted that, during the computation of a succeeding connectivity sub-matrix for a given input-port group g, there would be intervals of time during which the memory 1620 designated to hold the succeeding-connectivity sub-matrix would contain obsolete data for group g. This is, however, inconsequential because the method described below guarantees that the computation of the succeeding-connectivity sub-matrix is complete before the succeeding connectivity sub-matrix is needed. Optionally, the connectivity sub-matrix for input-port group-1 can be communicated directly to a respective slave controller because it may be computed during each configuration phase. This will be further described in relation to FIG. 19.

The complementary connectivity memories 1620 are numbered as 0 and 1. For example, memory 1620A can be identified by the numeral 0. The notation $J_g$ refers to one of the two complementary memories 1620 holding the current connectivity sub-matrix for group g, $1 \leq g \leq H$. The succeeding connectivity sub-matrix for group g, if already computed, would be held in connectivity memory $(1-J_g)$.

A connectivity-tracking matrix 1650, illustrated in FIG. 16-B, has H columns each of which corresponds to one of the H input-port groups. Each column has three entries 1652, 1654 and 1658. Each entry 1652 has a 1-bit indicator of the current connectivity memory for a corresponding input-port group (G1, G2, G3, or G4). Each entry 1654 corresponds to one of the input-port groups (G1, G2, G3, or G4) and contains a 1-bit indicator of the connectivity memory 1620A or 1620B that will be holding the connectivity sub-matrix 1522 in operation at a predetermined instant. Each entry 1658 contains an address pointer to the connectivity sub-matrix corresponding to the input-port group. The connectivity sub-matrices 1522 can be efficiently structured in several ways well known in the art. The connectivity-tracking matrix 1650 is held in a connectivity-tracking memory (illustrated in FIG. 18).

A configuration-control memory (illustrated in FIG. 18) associated with any of the master controllers 480, 490, 580, or 590, of a space switch in a reference core node 140, holds a configuration-control matrix 1710 that enables multi-phased reconfiguration of the edge-nodes with respect to a given reference core node.

FIG. 17-A illustrates a configuration-control matrix 1710 with respect to a core node 140 with H=4, $m_2$=4, $m_3$=4, $m_4$=2. FIG. 17-B illustrates a configuration-control matrix 1710 with respect to a core node with H=4, $m_2$=3, $m_3$=2, $m_4$=4. The number of rows in matrix 1710 is H and the number of columns is $$P_H = \prod_{j=2}^{j=H} m_j.$$

Thus, $P_H$=32 in the example of FIG. 17-A and $P_H$=24 in the example of FIG. 17-B.

The configuration-control matrix 1710 is denoted C and an entry C(k, g), corresponding to a column k, $0 \leq k < P_H$, that equals 0 indicates that a new connectivity sub-matrix for the corresponding input-port group is to be computed. Configuration-control matrix 1710 is read cyclically, and the columns 1720 of matrix 1710 are read sequentially, starting from k=0 to k=$P_H$-1. Each column contains data relevant to an edge-node group g, $1 \leq g \leq H$, and is processed to determine, for a respective edge-node group g, whether a new connectivity sub-array 1512 in a channel-switching space switch, or a new connectivity sub-matrix 1522 in a space switch 420, 430, 520, or 530, is to be recomputed.

When a connectivity sub-matrix 1522 (or a connectivity sub-array 1512) is recomputed, a new connectivity schedule is derived for at least one of the edge nodes in the edge-node group corresponding to the sub-matrix. The new connectivity is sent by a respective master controller to affected edge nodes.

Order of Computation of Connectivity Schedule

The connectivity schedule is computed by a controller 480, 490, 580, or 590, depending on the type of core node 140 (140A, 140B, 140C, and 140D, respectively).

Because of the difference in round-trip propagation delays between a reference core node and its subtending edge nodes, the computation of the connectivity preferably starts at different instants of time. Preferably, the instants of computation of the connectivity schedule should be aligned as indicated by the '0' entries in the configuration-control matrix 1710 of FIG. 17-A where at column 0 all the H groups would have updated connectivity schedules, at column 16 groups G1, G2, and G3 would have updated connectivity schedules, at columns 4, 8, 12, 20, 24, and 28 groups G1 and G2 would have updated connectivity schedules, and for all columns, group G1 would have an updated connectivity schedule. A similar pattern is indicated in FIG. 17-B. A column in the configuration-control matrix 1710 corresponds to the lowest configuration period P1. As described earlier, successive configuration periods bear an integer relationship to each other.

The structure of the configuration-control matrix 1710 permits recursive computation so that the connectivity schedule for the H groups can be performed sequentially where at the step of computing the connectivity schedule for each group g<H, the actual connectivity of all higher groups, i.e., groups $G_{g+1}$ to Group $G_H$, are known to the respective controller 480, 490, 580, or 590. The computation for an edge-node group (input-port group in the reference core node) is constrained only by higher groups. Thus, $G_H$, which has the largest configuration period $P_H$, is unconstrained, in the sense that it need not consider an existing connectivity. The mechanism for implementing this computation discipline is described with reference to FIGS. 19 and 20.

Reconfiguration Cycle

It is emphasized that the term reconfiguration refers to a reconfiguration opportunity, where a new connectivity schedule for an input-port group may be recomputed in response to changes in traffic levels. Thus, a connectivity schedule for any of the groups may remain unchanged for several successive reconfigurations periods if the traffic-intensity distribution remains unchanged.

The interval between successive reconfiguration instants for a group j is called a configuration period $P_j$, as mentioned earlier. Each reconfiguration of the highest group, $G_H$, defines a new reconfiguration cycle, having a period of $P_H$. The configuration-control matrix 1710 corresponds to a single reconfiguration cycle. A reconfiguration cycle has $m_H$ reconfigurations of group $G_{(H-1)}$, $m_H \times m_{(H-1)}$ reconfigurations of group $G_{(H-2)}$, and so on. Thus, according to the configuration-control matrix 1710 of FIG. 17-A, a reconfiguration cycle has two reconfigurations of group G3, eight reconfigurations of group G2, and 32 reconfigurations of group G1. According to the reconfiguration matrix 1710 of FIG. 17-B, the number of reconfigurations per reconfiguration cycle for groups G3, G2, and G1 are 4, 8, and 24, respectively.

The connectivity schedules for all groups are computed by a master controller and implemented by a slave controller, as described earlier.

Each column in matrix 1710 corresponds to the lowest configuration period P1. In a current reconfiguration cycle, at column 0 of matrix 1710, all input-port groups follow a new connectivity schedule. A column is read starting with the highest group H=4 (top row in matrix 1710). The value of C(0, 4) is '0', indicating that a connectivity schedule computed during the previous configuration period (in the previous reconfiguration cycle in this case) must now be implemented for G4 by a slave controller. Meanwhile, a new connectivity schedule for G4 is computed for use in the subsequent reconfiguration opportunity of G4. The value of C(0, 3) is also '0', and a connectivity schedule computed when column 16 was processed during the previous reconfiguration cycle is implemented by a slave controller. Meanwhile, a new connectivity schedule for G3 is computed for use at the subsequent reconfiguration instant, which coincides with the interval during which column 16 of the current reconfiguration cycle is processed. The value of C(0,2) is also '0', thus the connectivity schedule for G2 which was computed when column 28 was processed in the previous reconfiguration cycle is implemented by the slave controller. Meanwhile, a new connectivity schedule is computed for use at the next reconfiguration opportunity for G2 which coincides with the interval during which column 4 of the present reconfiguration cycle is processed. Finally, the value of each entry C(k, 1), $0 \leq k \leq P_H$, is '0', indicating that a previously-computed connectivity schedule for group 1 (G1) is to be implemented and a new connectivity schedule is to be computed with each column processing.

This mechanism applies for any edge-node grouping where the ratio of configuration periods for any two successive groups is an integer greater than unity (i.e., mj>1, j=2, . . . , H).

The computation of a new connectivity schedule for any group g, $1 \leq g \leq H$, is constrained by the reconfiguration latency, which would typically be dictated by the round-trip propagation delay between a reference core node and its subtending edge nodes. Therefore, when an entry C(k, g) is equal to '0', the master controller must be aware of the connectivity schedules of higher groups that will be in effect when a connectivity schedule for group g currently being computed is applied at the subsequent reconfiguration instant for group g. This awareness is facilitated by the use of the connectivity-tracking matrix 1650 described with reference to FIG. 16-B.

Figure 18:
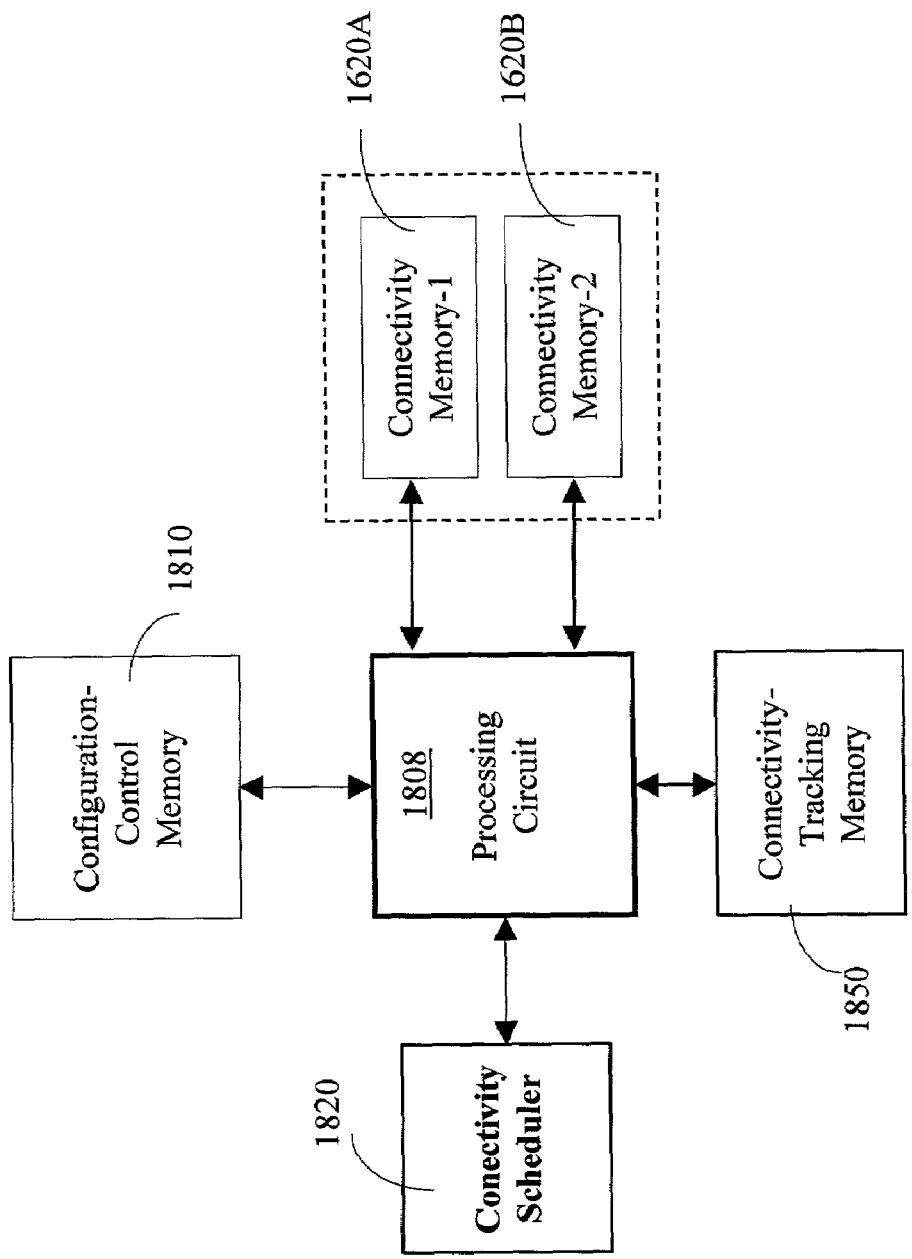
FIG. 18 is a block diagram of a connectivity scheduling device associated with a master controller of a core-node space switch, in accordance with an embodiment of the present invention.

A connectivity scheduling device associated with any of controllers 480, 490, 580, or 590 is illustrated in FIG. 18. The device comprises a processing circuit 1808, a connectivity scheduler 1820, a configuration-control memory 1810, two complementary connectivity memories, 1620A and 1620B, also referenced as connectivity-memory-1 and connectivity-memory-2, and a connectivity-tracking memory 1850. The connectivity scheduler 1820 computes a schedule for each input port 614 (FIGS. 6-A and 6-B), the schedule specifying an output port 624 (FIGS. 6-A and 6-B) and a corresponding instant in time at which a new connectivity is to be effected. The configuration-control memory 1810 holds the configuration-control matrix 1710. The complementary connectivity-memory-1 (1620A) and connectivity-memory-2 (1620B) interchangeably hold current and new connectivity schedules 1522 corresponding to the input-port groups. The connectivity-tracking memory 1850 holds the connectivity-tracking matrix 1650 which contains indicators of current connectivity memory, 1620A or 1620B, and corresponding address pointers to the memory sections 1622 holding the connectivity sub-matrices 1522 for the input-port group (G1, G2, G3, or G4).

Figure 19:
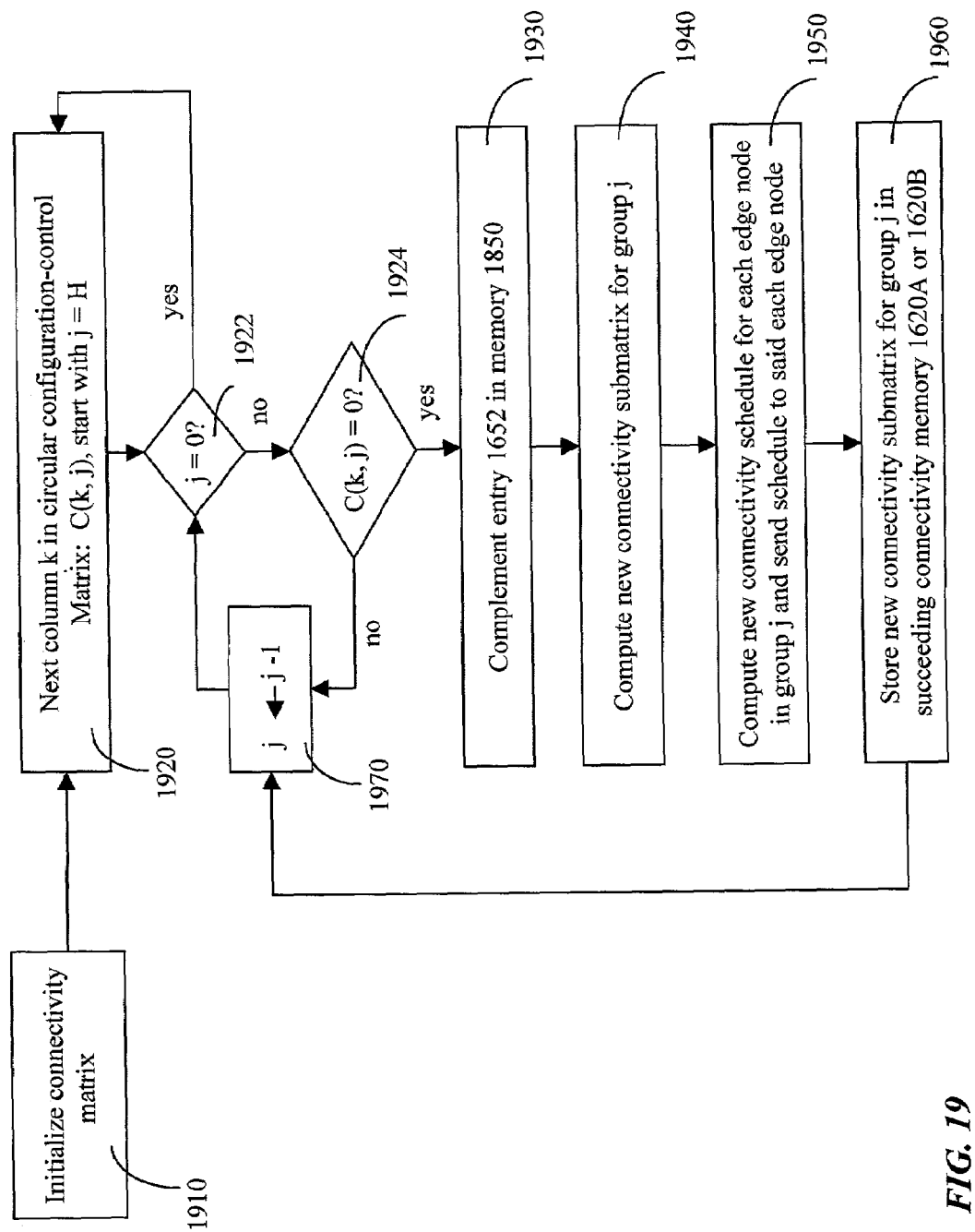
FIG. 19 is a flow chart of the process of computing connectivity sub-matrices for a multi-phase adaptive network, in accordance with an embodiment of the present invention.

FIG. 19 is a flow chart of a process, according to an embodiment of the present invention, of computing new connectivity sub-matrix 1522, to be stored in a memory section 1622 in one of the complementary memories 1620A or 1620B, and distributing relevant information to the edge nodes. FIG. 19 will be explained with respect to a TDM switching core node 140B or 140D. As mentioned above, the case of a channel switching core node 140A or 140C can be treated as a special case where the number of time slots per TDM frame is one, and the connectivity matrix 1520 degenerates to a connectivity array 1510.

In step 1910, the connectivity matrix is initialized using null entries. A null entry indicates that the corresponding input port of the space switch to be reconfigured is not yet assigned. Each row in a connectivity matrix 1520 corresponds to a time slot in a TDM frame and contains, for each input port, an identifier 1524 (normally a port number) of the output port to which the input port should connect during the time slot corresponding to the row. The configuration-control matrix 1710 is read sequentially. Each column has H entries each entry corresponding to one of the H input-port groups. It is noted that the number H is core-node specific. Each core node may define its own number of subtending edge-node groups. As described above, each input-port group corresponds to an edge-node group.

In step 1920, a column k in the configuration-control matrix 1710 is selected. The selection is cyclic starting with k=0 to k=$P_H$−1, then back to k=0 when k=$P_H$. For each value of k, the entry in the row corresponding to j=H is initially selected (step 1920). The input-port groups are examined in a descending order, starting from j=H, towards j=1. In step 1922, the edge-node group number, j, is examined to determine if the entire column has been processed. If j=0, control is transferred back to step 1920 where the column number k is increased by one. A value of j=0 indicates that the H entries of a current column in matrix 1710 have already been processed. The new number k, modulo $P_H$, corresponds to the new column in configuration-control matrix 1710 to be processed. If, in step 1922, j>0, then at least one of the entries of the current column remains to be processed. Thus, in step 1924 the entry C(k,j) in the configuration-control matrix 1710 is examined to determine if new connectivity computation is required. If entry C(k, j) equals 1, the next input-port group, (j−1) is selected and control is transferred back to step 1922 through step 1924. As described above, step 1922 terminates column processing when the value of g reaches zero. Thus, the value of j when step 1924 is reached can not be less than 1.

If, in step 1924, entry C(k,j)=0, then the following steps 1930, 1940, 1950, and 1960, are executed before examining the next-edge-node group (j−1), with j>1. In step 1930, the entry for group j in the connectivity-tracking matrix 1650 is complemented (from 0 to 1 or vice versa) to point to the memory 1620 (1620A or 1620B) presently holding the succeeding connectivity sub-matrix for group j, and now becoming the current connectivity sub-matrix for group j.

In step 1940 a new connectivity sub-matrix for group j is computed. The computation must also determine a new connectivity for each edge node that must change its connectivity and that belongs to edge-node group j corresponding to input-port group j. This step is further detailed in FIG. 20.

In step 1950, the individual edge-node connectivity updates are computed and distributed to affected edge nodes. Edge-node-specific connectivity changes are communicated to respective edge nodes. In step 1960, the new connectivity sub-matrix 1522 for group j is placed in a corresponding section in the succeeding connectivity memory 1620A or 1620B, which is determined to be the complement of the value (0 or 1) in an entry 1652 corresponding to group j as determined in step 1930. Control is then transferred back to step 1970.

The next input-port group, j−1, determined in step 1970, is then examined in step 1922, and if j>0, indicating a remaining edge-node group in the column k, the sequence of steps 1924, 1930, 1940, 1950, and 1960 is repeated. If step 1922 indicates that j=0, the next column in the configuration-control matrix 1710 is selected. It is noted that, according to another embodiment of the present invention, the reconfiguration process described with reference to FIG. 19 is a continuous and endless process and, therefore, there is no termination exit in step 1920 which continuously and cyclically scans the configuration-control matrix 1710.

Figure 20:
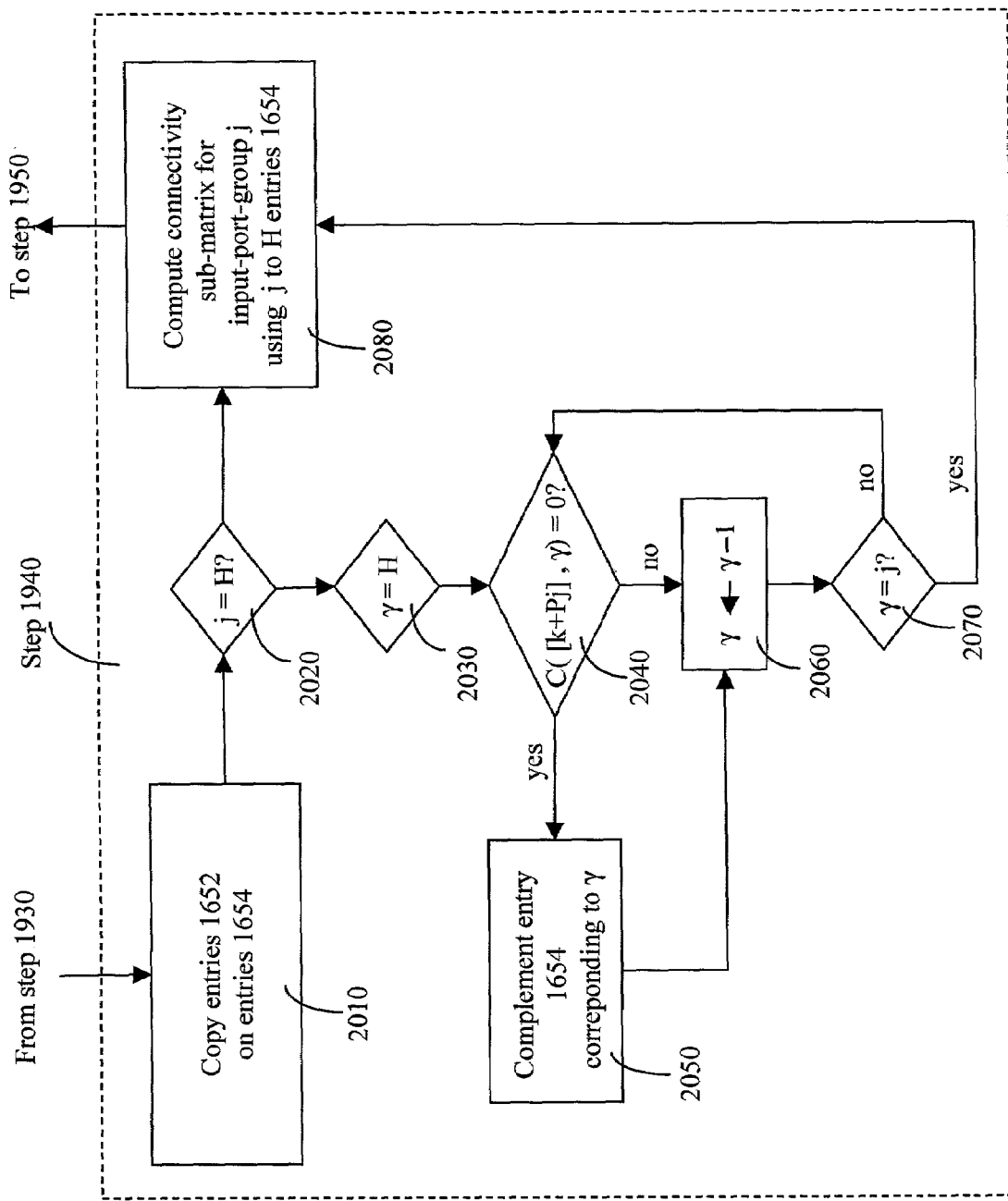
FIG. 20 details the computation of a connectivity sub-matrix, in accordance with an embodiment of the present invention.

FIG. 20 details steps in a process according to an embodiment of the present invention for the computation of a connectivity sub-matrix. In step 2010, a next-connectivity-vector, comprising entries 1654 in connectivity-tracking matrix 1650, having H entries preferably 1-bit-wide each, is initialized by equating each entry to a corresponding entry in field 1652 of the connectivity-tracking matrix 1650. In step 2020, if it is determined that the value of j, received from step 1930, equals H, i.e., the sub-matrix to be computed belongs to input-port group H, control is transferred directly to step 2080 where the connectivity sub-matrix is determined without the constraints of a higher sub-matrix, i.e., with all input ports (and hence all output ports) being unassigned. It is preferable, however, that the assignment of time slots in a TDM core node 140B or 140D not deviate unnecessarily from a current assignment. If, in step 2020, the value of j is less than H, then the computation of connectivity sub-matrix for group j must be based on the relevant connectivity, which is connectivity sub-matrices of higher input-port groups at the instant the new connectivity sub-matrix of group j will be in effect. This can be determined by examining a subsequent column determined by adding the configuration period Pj to the current column number, modulo $P_H$ in configuration-control matrix 1710. A convenient way to determine the relevant connectivity is to use the next-connectivity vector (entries 1654 in connectivity-tracking matrix 1650) to point to the relevant connectivity sub-matrices 1522 in the two complementary connectivity memories 1620. Thus, in step 2030, a variable γ is equated to H then in step 2040, the entry in configuration-control matrix 1710 corresponding to column [k+Pj], where [k+Pj] denotes k+Pj modulo $P_H$ (matrix 1710 is read cyclically), i.e., C([k+Pj], γ) is examined. If this entry is equal to 1 (it can only be 0 or 1), control is transferred to step 2060. If C([k+Pj], γ) is equal to 0, the entry 1654 (0 or 1) in the next-connectivity vector (in connectivity-tracking matrix 1650) corresponding to group j is complemented (if it is 0 it becomes 1 and vice versa) and control is transferred to step 2060.

In step 2060, the value of γ is decreased by 1, then, in step 2070 if the value of γ is found to have reached the value j, the required sub-matrices of input-port groups higher than group g would have been identified and control is transferred to the main computation step 2080. If, in step 2070 γ is found to be greater than j, control is transferred back to step 2040.

In the computation of the connectivity sub-matrix for group g in step 2080, the higher connectivity sub-matrices 1522 are identified from the next-connectivity vector (entries 1654 in connectivity-tracking matrix 1650) and are used as constraints. None of the entries {input-port, output-port, time slot} in the higher connectivity sub-matrices can be assigned to the new connectivity sub-matrix to be computed.

To summarize, in order to establish paths of adaptive capacities, each edge node is preferably provided with (1) means for determining appropriate bit rate allocations to each other edge node,
(2) means for signaling the allocations to controllers associated with the core nodes,
(3) means for time-locking to selected core nodes, and
(4) means for timing the transfer of data to newly configured paths, and each core node preferably has (1) means for receiving bit rate allocation requests from adjacent edge nodes,
(2) means for exchanging time-locking signals with edge nodes,
(3) means for time measurements,
(4) means for computing a connectivity schedule, and
(5) means for communicating the schedule to a plurality edge nodes.

Embodiments of any of the aspects of the present invention can be implemented as a computer program product for use with a computer system. Such implementation may include a series of computer instructions provided either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product). For example, in a method according to an embodiment of the present invention, various steps may be performed at each of a core node controller or an edge controller. These steps may be implemented via software that resides on a computer readable memory located at each of said core node controller or said edge node controller.

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of adaptively configuring a network, said network having at least one core node and a plurality of edge nodes, the method comprising the steps of:
   time-locking each of said edge nodes to each of said at least one core node;
   grouping edge nodes of the plurality of edge nodes according to a reconfiguration latency of each edge node, to produce a plurality of edge-node groups;
   assigning a group reconfiguration-latency threshold to each edge node group; and
   periodically reconfiguring paths associated with edge nodes in said each edge node group at said group reconfiguration-latency threshold.

2. A method according to claim 1 wherein said edge-node groups are ordered according to said group reconfiguration-latency threshold and wherein the group reconfiguration-latency threshold of each succeeding edge-node group is selected to be an integer multiple of the group reconfiguration-latency threshold of a preceding edge-node group.

3. A method according to claim 1 wherein each edge node of said plurality of edge nodes further comprises a source node and wherein a the reconfiguration latency of said each edge node of said plurality of edge nodes comprises a round trip delay between said each edge node of said plurality of edge nodes and said each of said at least one core node.

4. A method according to claim 1 wherein said plurality of edge nodes further comprises source nodes and sink nodes and wherein the reconfiguration latency of each edge node of said plurality of edge nodes comprises a round trip delay between said each edge node of said plurality of edge nodes and a one of said sink nodes over paths traversing said each of said at least one core node.

5. A method according to claim 1 wherein said group reconfiguration-latency threshold for each of said edge-node groups is dynamically derived from network measurements.

6. A method according to claim 5 wherein said network measurements comprise round-trip latencies.

7. An apparatus for adaptively configuring a network, said network having at least one core node and a plurality of edge nodes, said apparatus comprising:
   means for time-locking each of said edge nodes to each of said at least one core node;
   means for grouping edge nodes of the plurality of edge nodes, according to a reconfiguration latency of each edge node, to provide a plurality of edge node groups;
   means for assigning a group reconfiguration-latency threshold to each edge node group; and
   means for periodically reconfiguring paths associated with edge nodes in said each edge node group at said group reconfiguration-latency threshold.

8. An apparatus according to claim 7 wherein the edge-node groups are ordered according to said group reconfiguration-latency threshold and wherein the group reconfiguration-latency threshold of each succeeding edge-node group is selected to be an integer multiple of the group reconfiguration-latency threshold of a preceding edge-node group.

9. An apparatus according to claim 7 wherein each edge node of said plurality of edge nodes further comprises a source node and wherein a the reconfiguration latency of said each edge node of said plurality of edge nodes includes a round trip delay between said each edge node of said plurality of edge nodes and said each of said at least one core node.

10. An apparatus according to claim 7 wherein said plurality of edge nodes further comprises source nodes and sink nodes and wherein a the-reconfiguration latency of each edge node of said plurality of edge nodes comprises a round trip delay between said each edge node of said plurality of edge nodes and a one of said sink nodes over paths traversing said each of said at least one core node.

11. An apparatus according to claim 7 wherein said group reconfiguration-latency threshold for each of said edge-node groups is dynamically derived based on network measurements.

12. An apparatus according to claim 7 wherein said each of said at least one core node is an optical core node.

13. An apparatus according to claim 7 wherein said each of said at least one core node is an electronic core node.

14. An apparatus according to claim 13 wherein said electronic core node is provided with a data buffer.

15. An apparatus according to claim 12 wherein said means for time-locking each of said edge nodes to each of said at least one core node comprises means for time locking at least one wavelength channel in a wavelength division multiplexing path between one of said edge nodes and said optical core node.

* * * * *